April 14, 1959 T. A. WETZEL 2,882,476
MOTOR CONTROL SYSTEM
Filed Oct. 20, 1954 5 Sheets-Sheet 2

INVENTOR
Theodore A. Wetzel.
BY
Attorney

April 14, 1959     T. A. WETZEL     2,882,476
MOTOR CONTROL SYSTEM

Filed Oct. 20, 1954     5 Sheets-Sheet 3

INVENTOR
Theodore A. Wetzel
BY
Attorney

April 14, 1959
T. A. WETZEL
2,882,476
MOTOR CONTROL SYSTEM
Filed Oct. 20, 1954
5 Sheets-Sheet 5
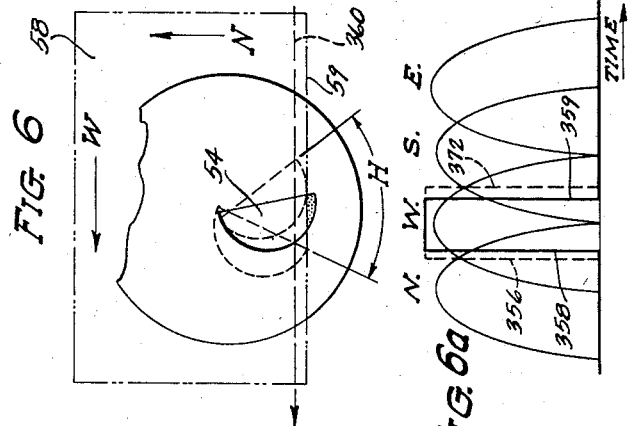
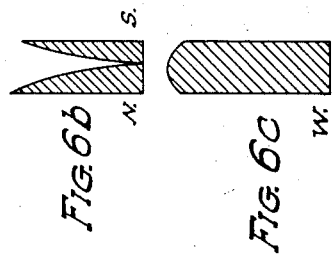
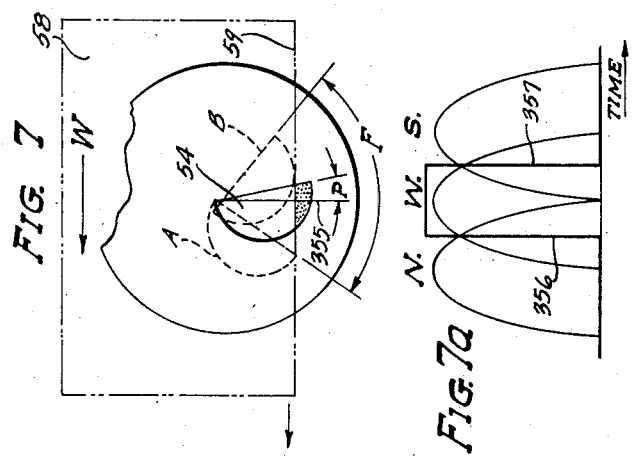
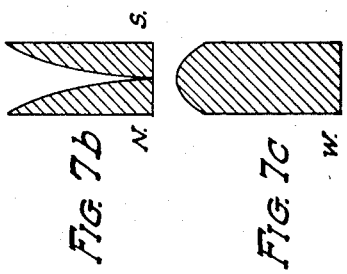
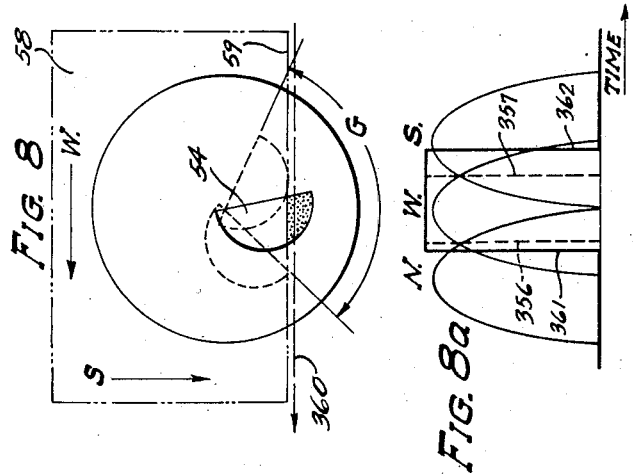
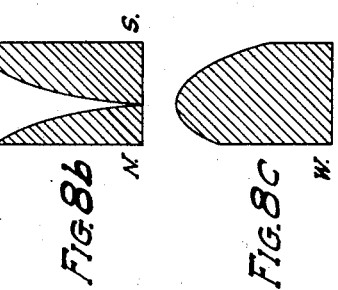
INVENTOR
Theodore A. Wetzel
BY
Attorney

United States Patent Office 2,882,476
Patented Apr. 14, 1959

2,882,476
MOTOR CONTROL SYSTEM

Theodore A. Wetzel, Brookfield, Wis., assignor to Kearney & Trecker Corporation, West Allis, Wis., a corporation of Wisconsin Application October 20, 1954, Serial No. 463,401

17 Claims. (Cl. 318—162)

This invention relates generally to control systems, and more particularly to an improved system, wherein electrical control voltages for controlling an apparatus are stored on a record for subsequent reproduction to control the operation of one or a plurality of such apparatuses.

Previous control systems employing a record for producing control voltages to control the operation of a machine depend solely upon position signals for their operation. The control voltages produced and recorded are a function of the instant position of the machine member being controlled and when these voltages are played back to effect the desired control, they determine the position of the machine member at any given instant in the cycle. In such arrangement, operation of the system is predicated upon the existence of a continuous error signal created by the machine member being constantly displaced a slight amount from the desired position at a given instant. Obviously, therefore, since the operation of the control system is dependent upon a continuous error signal, a slight inaccuracy is always present in the position of the machine members at a given instant. It is a purpose of the present invention to eliminate such continuing inaccuracy in position, by recording a velocity signal for controlling the movement of the machine member on playback; in which case the requirement of a position error signal for sustaining the movement of the machine member is avoided, and in conjunction therewith to employ a position error signal as a supplemental velocity control to maintain the proper position of the machine member when a position inaccuracy occurs as indicated by the presence of a position error signal.

It is a general object of the present invention to provide an improved control system for controlling one or more machines in accordance with data stored on a record.

Another object of the present invention is to provide an improved control system which is not solely dependent upon an error signal for its operation.

Another object of the present invention is to provide a control system for controlling the operation of one or more machines in response to recorded data with a high degree of accuracy.

Another object is to provide a control system for controlling the operation of one or more machines in response to recorded data in which a plurality of control voltages are recorded nad reproduced to effect precision control of machine tool members for guiding a cutter in a definite path relative to a workpiece.

A further object is to provide a control system for controlling the operation of one or more machines in response to recorded data comprising velocity control signal voltages and position signal voltages combined to make available the advantages of both these control voltages in a single control system for improved accuracy.

According to this invention the improved control system provides for the recording of control voltages for subsequent reproduction to control a machine tool or a plurality of machine tools for guiding a cutter in a path of travel relative to a workpiece. For accurate control two distinct types of control voltages are recorded, one constituting velocity signal voltages and the other position signal voltages. In order to create these control voltages for storage on a record, the velocity signals are produced and applied to control the machine tool for the purpose of effecting movement of the cutter relative to the workpiece in the desired path of travel. While the velocity signals are controlling the operation of the machine they are being recorded for subsequent reproduction.

The operation of the machine in accordance with the velocity signal voltages function to produce position signal voltages which are also recorded with the velocity signal voltages for subsequent simultaneous reproduction. To repeat the movement of the cutter in the selected path of travel relative to the workpiece, the record is played back and the control voltages are applied to one or more of the same type of machine tools for similarly controlling their operation. The velocity signal voltages serve to produce energization of the motors at a given instant similar to the energization produced at the corresponding instant when the record was made. The machine is not entirely dependent upon position error signals caused by inaccuracy of position to produce this energization of its feeding motions.

However, if the recorded velocity signals were used exclusively for playback, errors would occur in the operation when the machine is under the control of these velocity signal voltages if the loads on the motors at any given instant are different from the loads existing at the corresponding instant when the record was made. Such variances in the loads may occur as a result of different conditions existing due to changes in the frictional re-resistances of the moving parts, cutter loads and other factors.

On the other hand in association therewith, the recorded position signal voltages are not arranged to produce a specific energization of the motors of the machine tool, but when compared with the position signal voltages of the machine operating under control of the above mentioned velocity signal voltages on playback, a position error signal voltage is produced for the purpose of modifying said velocity signal voltages and thus reduce this position error voltage to null. When the members of the machine are accurately positioned at any given instant the position error signal voltages are of zero magnitude, and the machine is under the control of the velocity signal voltages alone. If for the reasons stated above, the velocity signal voltages produce an inaccurate positioning of the machine tool members, the position error signal voltages immediately react to modify the energization of the motors for the purpose of obtaining the desired accurate positioning of the machine tool members. Thus, by combining the velocity signal voltages and the position error signal voltages, the machine tool motors are caused to be controlled in such fashion that the disadvantages of individual signal voltages are eliminated, and the machine repeats the movement of the cutter relative to the workpiece in the desired path of movement with a degree of acuracy not otherwise attainable.

The foregoing and other objects of this invention, which will become more fully apparent from the following detailed description, may be achieved by the particular illustrative machine tool depicted in and described in connection with the accompanying drawings, in which.

Figure 2:
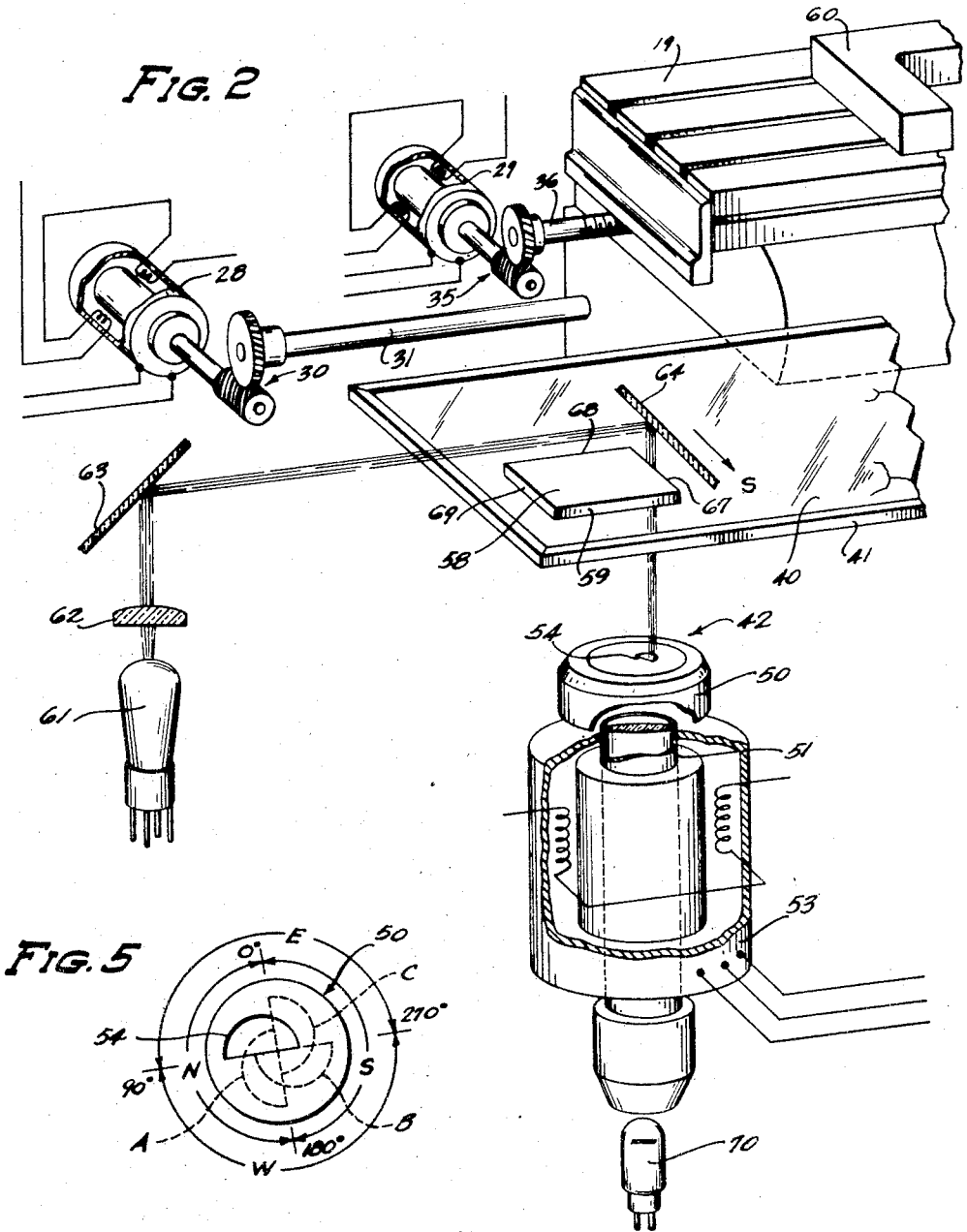
Fig. 2 is an enlarged fragmentary view partly diagrammatic and partly in perspective depicting a portion of the control mechanism for controlling the operation of the machine illustrated in Fig. 1.
Figure 9:
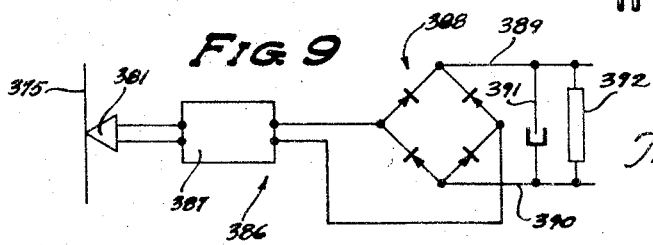
Figure 3:
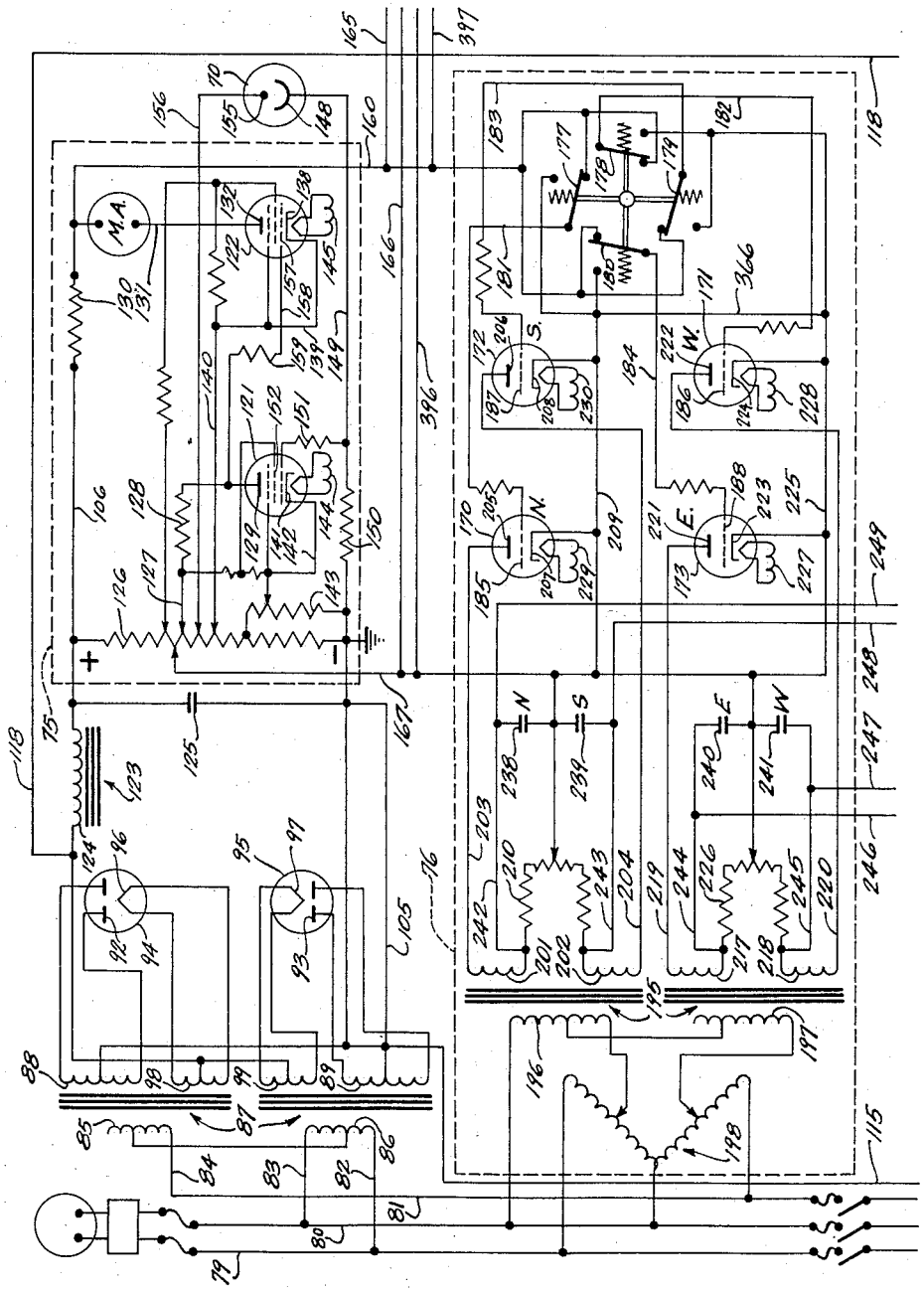
Fig. 3 is a schematic wiring diagram showing the electrical control circuit connected to cooperate with the control mechanism shown in Fig. 2 for producing control voltages.
Figure 4:
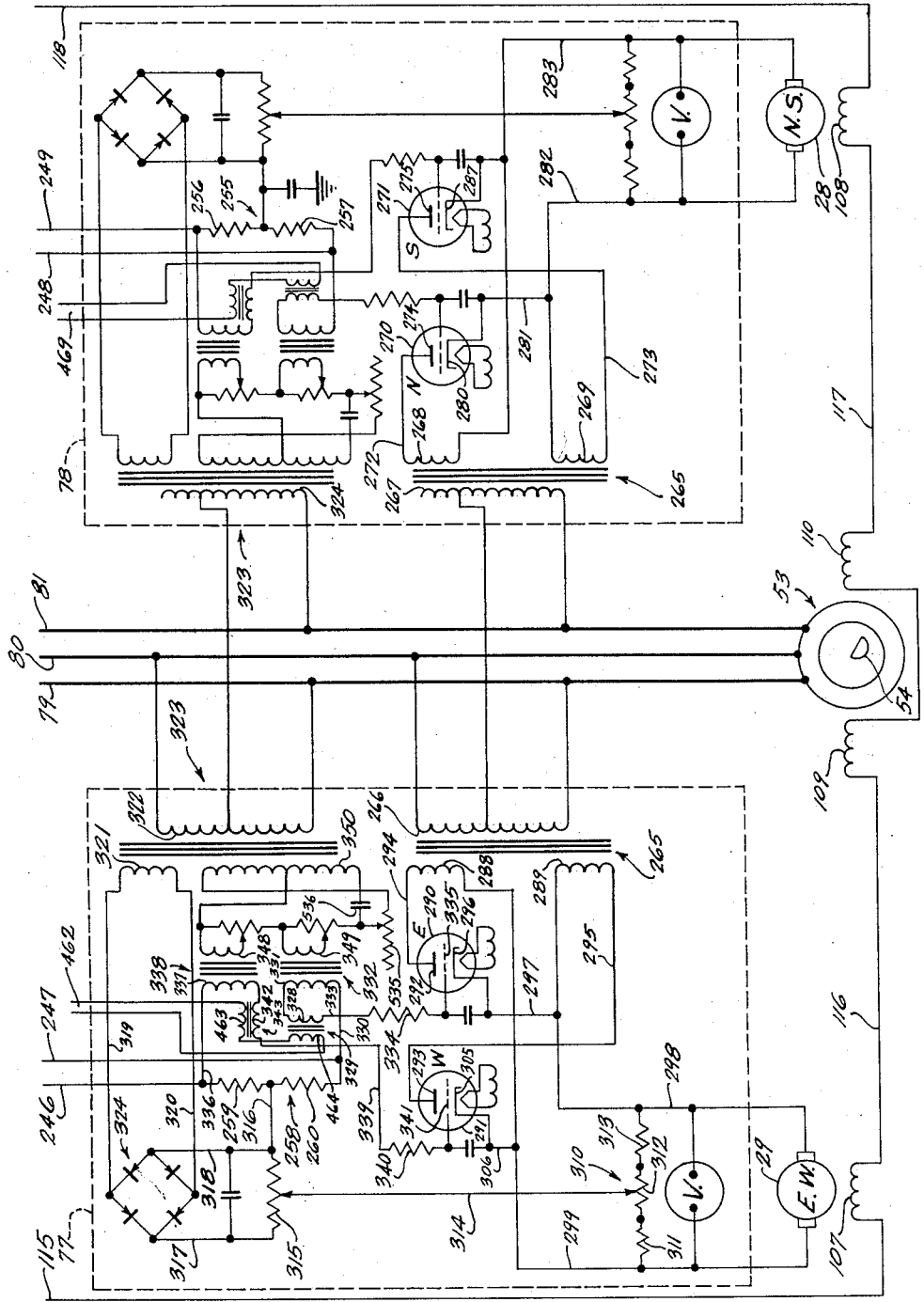
Fig. 4 is a schematic wiring diagram showing the electrical control circuit connected to cooperate with the control circuit illustrated in Fig. 3 for controlling the operation of the feed motors of the machine.

Figs. 6 to 8c inclusive are diagrammatic views representing the lateral correcting effect of the control mechanism shown in Fig. 2 operating in conjunction with the electrical control circuits of Figs. 3 and 4; and, Fig. 9 is a schematic wiring diagram illustrating the electrical circuit for converting the voltages received from the record into square wave voltages.

Figure 1:
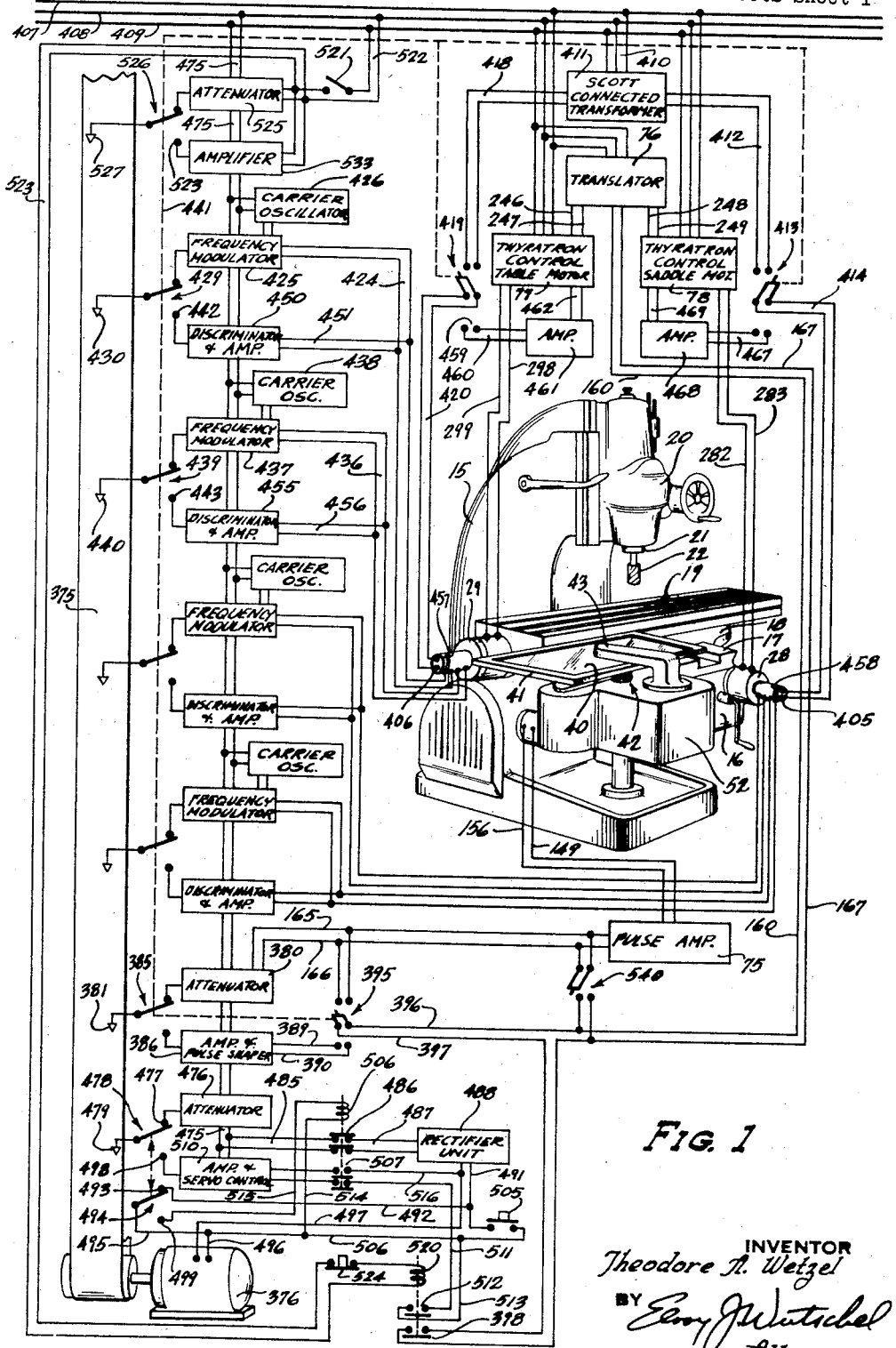
Figure 1 is a diagrammatic view illustrating a control system embodying the features of the present invention applied to a milling machine.

Reference is now made more particularly to the drawings and specifically to Fig. 1 thereof showing the improved control system of the present invention applied to a pattern controlled milling machine of the type described in detail in my copending patent application, Serial No. 246,980, filed September 17, 1951. Although the control system is shown in conjunction with a pattern controlled milling machine it is so shown as an illustrative embodiment only, and may be used for controlling the operation of other types of machines without departing from the spirit and scope of the invention.

The milling machine shown in Fig. 1 is of the vertical spindle, knee and column type comprising essentially a vertically upstanding column 15 which slidably supports a knee 16 for vertical movement. The knee 16, in turn, has ways 17 formed on its top surface for the purpose of slidably carrying a saddle 18 for horizontal movement, with the latter, in turn, slidably supporting a work table 19 for horizontal movement in a direction transverse to the direction of movement of the saddle 18. The column 15 also supports a spindle head 20 for vertical movement above the table 19. A spindle 21 is journalled in the spindle head 20 and is connected to be rotated by power in well known manner. A cutter 22 is secured to the spindle 21 to be rotated by it in position to operate upon a workpiece disposed on the work table 19.

Power for effecting feeding movement of the saddle 18 and table 19 is derived from a pair of reversible feed motors 28 and 29 respectively. The feed motor 28 is secured to the knee 16, and as shown diagrammatically in Fig. 2, is connected through a worm and worm wheel 30 to rotate a shaft 31. The power is transmitted by the shaft 31 to suitable gearing (not shown) to rotate a feed screw (not shown) journaled in the knee 16 and disposed to engage a feed nut (not shown) secured in the usual manner to the under side of the saddle 18. Selective energization of the saddle feed motor 28 is operative to effect feeding movement of the saddle and table forward or away from the front face of the column 15.

The feed motor 29 is secured to the end of the table 19, and is connected to a worm and worm wheel 35 to actuate a feed screw 36 journalled, in the table 19 and connected in well known manner to engage a feed nut (not shown) secured to the upper surface of the saddle 18. Thus, selective energization of the table feed motor 29 is operative to rotate the feed screw 36 for effecting longitudinal movement of the table 19 in either a right or left-hand direction of travel relative to the saddle 18.

In order to facilitate the description, the movement of the saddle 18 will be considered as effecting movement of the workpiece in a north or south direction, while the longitudinal movement of the table 19 will be considered as producing a movement of the workpiece in an east or west direction. Thus, energization of the feed motors 28 and 29 will operate to effect feeding movement of the workpiece in a north, south, east or west direction of travel, and simultaneous energization of both of the feed motors 28 and 29 will effect a resultant feeding movement of the workpiece in any selected direction of travel, intermediate the four basic points of the compass with the direction of travel dependent upon the direction and rate of operation of the feed motors. Thus, if the table feed motor 29 is energized to effect westward table movement, and the saddle feed motor 28 is simultaneously energized at the same rate to effect northward movement, the resultant feeding movement of the workpiece will be in a northwest direction of travel.

The milling machine shown in the drawings for the purpose of illustrating an exemplary embodiment of the present invention is equipped for automatic operation under the control of a pattern to produce movement of the cutter 22 relative to a workpiece in a path corresponding to the contour of the periphery of the pattern, so that the pattern will be reproduced in the workpiece. In the particular machine illustrated, an optical scanning device is employed for scanning the edge of the pattern to produce control signals in accordance with the peripheral contour of the pattern, which produce control voltages for controlling the operation of the feed motors 28 and 29 to effect the desired movement of the cutter 22 relative to the workpiece. These control voltages produce the desired movement of the cutter relative to the workpiece by establishing the velocity of the movable members 18 and 19 at any particular instant in the operation, and are therefore referred to as velocity signal voltages. In practicing the present invention, these velocity signal voltages are recorded while they are controlling the operation of the machine, so that when the record is played back, the velocity signal voltages will be reproduced and applied to control the velocity of the two machine members in similar manner, to thereby repeat the movement of the cutter relative to the workpiece in the path of travel traversed while the record was being made.

Although a particular method of producing such velocity control voltages is shown, and these control voltages are shown in conjunction with a specific control circuit for operating the machine, it is to be understood that the method of producing the control voltages and the associated circuit constitutes an exemplary embodiment only, and other means may be employed without departing from the spirit and scope of the present invention. For example, a stylus arranged to make physical contact with the pattern may be utilized with suitable electrical circuitry for producing velocity signal voltages to control the operation of the machine as desired, and such control voltages could be recorded for employment in the same manner as are the velocity control voltages produced by the apparatus illustrated in the drawings. However, for a thorough understanding of the present invention, it is essential that the operation of the control circuit of the machine with which it is used be understood, and therefore the control circuit of the illustrated machine will be described in considerable detail, although by itself it does not constitute a part of the present invention.

As previously mentioned, the illustrated pattern controlled machine tool employs an optical scanning device for producing the control signals for controlling the operation of the feed motors 28 and 29. In order that the pattern may be retained in laterally spaced relationship to a workpiece carried by the work table 19, a horizontally disposed transparent pattern support member 40 is secured by means of a bracket 41 to the leftward forward edge of the table 19. It will be readily apparent that selective energization of the feed motors 28 and 29 will produce a coordinate feeding movement of the pattern support 40 and the work table 19 along identical paths of travel.

As the work table 19 is caused to be moved relative to the cutter 22, the pattern support 40 will likewise be moved relative to a scanning device 42 positioned below it in fixed spaced relationship to the axis of the cutter 22. The scanning device 42 is positioned directly below a relatively intense beam of light that is directed coaxially downward from the inner end of a horizontal arm member 43 carried in parallel spaced relationship above the transparent pattern support 40. When the machine is in operation, light from the forward end of the arm 43 is directed downwardly toward the scanning device 42 in a manner to be partially intercepted by the light differentiating edge of a pattern interposed therebetween and that is supported on the selectively movable pattern support 40. The scanning device 42 constitutes a sensing mechanism of the control system that is sensitive to a line of trace formed by the representation of a contour carried by the pattern support for selectively energizing the feed motors 28 and 29. The feed motors are, in turn, operative to effect a coordinate feeding movement of the pattern support 40 and work table 19 along a path of travel corresponding in configuration to the guiding contour formed by the peripheral edge of the pattern, thereby effecting a uniform advancement of the line of trace relative to the scanning device.

As shown in Fig. 2, the scanning device 42 comprises a rotatable shutter head 50 attached to the upper end of a tubular shaft 51 extending upwardly from a housing 52 secured to the front face of the knee 16. The rotatable shutter head 50 is driven at a synchronized speed, for example, 3600 r.p.m. by the hollow shaft 51 of a motor 53 mounted within the housing 52. The shutter head 50 is provided in its upper surface with a D-shaped light passing opening 54 arranged to pass light downwardly through the hollow motor shaft 51 in the form of a light beam. The D-shaped opening 54 is positioned eccentrically with respect to the rotational axis of the hollow motor shaft 51 and may be termed the copy aperture. Inasmuch as the shutter head 50 is normally rotated continuously in a counterclockwise direction, the eccentrically positioned D-shaped copy aperture 54 is disposed to produce a continuously moving copy signal light beam.

During a copying operation, a pattern, such as the opaque male pattern 58 shown in Fig. 2 is positioned on the transparent pattern support 40 in such a manner as to partially overlie the shutter head 50 as well as the orbital path of movement of the copy aperture 54. As a result, the copy aperture 54 is thereby moved into overlapping relationship with an edge 67 of the pattern 58 delineating a relatively straight line of trace once during each revolution or cycle of operation.

With the shutter head 50 being continuously rotated in a counterclockwise direction, the copy aperture 54 is disposed to provide a continuous succession of light beam pulses or signals for effecting feeding movement of the pattern support 40 and the work table 19 along a path of travel corresponding to the contour of the male pattern 58. The regularly recurring copy signal light beam pulses, formed as the D-shaped copy aperture 54 overlaps the edge 67 of the pattern 58, function to control the velocity of the saddle 18 and table 19 to thereby produce the directional movement of the pattern 58 so that the edge of the pattern is continuously retained a fixed normal distance from the rotational axis of the shutter head 50. Since the pattern 58 is being continuously advanced in response to the regularly recurring light pulses passed by the copy aperture 54, the copy aperture will be moved into overlapping relationship with successively new portions or edge zones of the pattern. Any slight angular changes in the advancing edge of the pattern will produce a change in the duration of the copy signal light pulses, which, in turn, operate to re-establish the pre-existing pulse duration by virtue of correcting the direction of pattern movement in conformity with the changed path of travel dictated by the pattern. Generally, a male pattern, such as the pattern 58, is used to guide feeding movement of the work table 19 relative to the cutter 22 in a manner that a female contour can be generated in a workpiece, for example, the workpiece 60 partially shown on the worktable 19 in Fig. 2.

In order that the copy aperture 54 may pass sharply defined light beam signal pulses, a well collimated intense beam of light is directed downwardly toward the shutter head 50 from the inner end of the hollow arm member 43. As shown diagrammatically in Fig. 2 the light beam is derived from an arc lamp 61 disposed within the housing 52 to direct light upwardly toward the arm member 43. From the arc lamp 61, light is directed vertically upward through a condensing lens 62 mounted within the arm member 43 to form a well collimated beam. The beam of light then continues toward an angularly positioned reflecting mirror 63 mounted within the arm member 43. From the mirror 63, the light is reflected horizontally through the hollow central portion of the arm member 43 toward a semi-transparent angularly positioned mirror 64 secured at the inner end of the arm member. The semi-transparent mirror 64, in turn, serves to reflect the major portion of the light beam, vertically downward through the transparent pattern support 40 toward the shutter head 50.

The male pattern 58 shown in the drawings is so positioned on the pattern support 40 that the opaque portion thereof is disposed to completely overlie the axis of rotation of the shutter head 50. As the pattern is displaced along a path of movement determined by its configuration, its respective edges 67, 68, 69 and 59 will be successively moved relative to the shutter head 50 in a manner that the rotational axis thereof is maintained a fixed normal distance from each moving pattern edge and under the opaque zone. The orbitally moving copy aperture 54 sweeps into overlapping relationship with an edge of the pattern once during each cycle, to pass a single copy signal light pulse comprising one of a continuous succession of recurring copy signal light pulses that are translated into velocity signal voltages to effect continuous directionally controlled movement of the pattern and workpiece at a substantially uniform feeding rate.

The direction of pattern movement is opposite to the rotary movement of the copy aperture 54 which is continuously rotated in a counterclockwise direction in a manner that the straight or leading edge thereof overlaps the pattern edge first to initiate the passage of a copy signal light beam or light pulse. Each copy signal light beam thus initiated is terminated by movement of the trailing or circular portion of the copy aperture back over the moving pattern edge and into a zone below the opaque area which intercepts light projected downwardly from the arm 43 toward the shutter head 50. In actual operation, the degree by which the rotating copy aperture overlaps the pattern edge is extremely slight and for practical purposes, therefore, it may be said that the pattern edge is substantially tangential to the orbital path of movement described by the outermost end of the copy aperture.

Since the respective pattern edges are moved in a direction opposite to the direction of shutter head rotation, the copy aperture 74 will overlap an edge of the pattern to initiate a copy signal light pulse at a point slightly ahead of the point at which it again crosses the pattern edge to terminate that particular light pulse. There is a measurable distance between the respective points on the contour at which a copy signal is respectively initiated and terminated, this distance being termed the edge zone for controlling the direction of movement. As the pattern is moved relative to the shutter head, the copy aperture is continuously moved into overlapping relationship with successively overlapping edge zones of the guiding contour.

To selectively energize the feed motors 28 and 29 for effecting coordinate feeding movement of the pattern support 40 and work table 19 along any required directional path of movement, a photoelectronic feed motor regulating system, contained partly in the housing 52 and partly in a control cabinet (not shown) is arranged to be activated by the light beam signals passed by the rotating shutter head 50. As shown in Fig. 2, the electronic regulating system is provided with a signal receiving photoelectric cell 70 mounted within the housing 52 below the hollow motor shaft 51 of the synchronous shutter head motor 53.

The photoelectronic motor regulating system, represented as an electrical circuit in Figs. 3 and 4, comprises essentially a photo signal amplifier 75 enclosed within the dotted lines in Fig. 3 and represented diagrammatically by a rectangular enclosure in Fig. 1, and an electronic translator 76 that is operative to transform amplified control signals into pulsating electrical control voltages for activating one or the other of two electronic motor controllers 77 and 78 shown in Fig. 4. The saddle feed motor 28 and the table feed motor 29 are thereby selectively energized for rotation in a clockwise or counter-clockwise direction in accordance with the activation of one or the other of the two motor controllers 77 and 78 respectively. In order that the feed motors 28 and 29 may be selectively energized to effect feeding movement of the work table 19 along any required path of travel, the electronic translator 76 is disposed to constitute an electrical commutating timing device that operates in exact synchronism with the continuously rotating shutter head 50. Thus, the translator 76 is disposed to provide electrical control voltages for effecting the required directional feeding movement of the table in accordance with the angular orientation of the shutter head 50 about its axis at the instant a particular light beam signal is formed by the copy aperture 54.

Referring more specifically to Fig. 3, power is supplied from a suitable source through three phase alternating current lines 79, 80 and 81 that are connected directly to supply current for driving the armature of the synchronous shutter head motor 53 as shown in Fig. 4. From the three phase lines 79, 80 and 81, power is transmitted through branch conductors 82, 83 and 84 to the primary coils 85 and 86 of Scott connected transformers 87, having secondaries 88 and 89 respectively, which are connected to supply two phase current to plates 92 and 93 of a pair of full wave rectifiers 94 and 95. The cathodes 96 and 97 of the rectifiers 94 and 95 are connected to coils 98 and 99 that are respectively energized by the primary coils 85 and 86 of the Scott connected transformers 87. The mid-points of the secondary coils 88 and 89 are connected to a common conductor 105. Likewise, the mid-points of the coils 98 and 99 disposed to energize the rectifier cathodes are connected to a common conductor 106.

The full wave rectifiers 94 and 95 provide a source of rectified direct current for energizing field windings 107 and 108 of the direct current feed motors 29 and 28 as well as field windings 109 and 110 of the synchronously driven shutter motor 53. A conductor 115 connected to the common conductor 105 of the direct current power source as shown in Fig. 3, transmits current to the field 107 of the table feed motor 29 shown in Fig. 4, which is connected in series with the fields 109 and 110 of the synchronous motor 53 by means of a conductor 116. The field 110, in turn, is connected in series by means of a conductor 117 with the field winding 108 of the saddle feed motor 28 which is connected by means of a conductor 118 to the common conductor 106 of the power circuit as shown in Fig. 3.

The direct current power circuit leading from the full wave rectifiers 94 and 95 to the common conductors 105 and 106 is also disposed to provide unidirectional current for energizing the signal receiving photoelectric cell 70 and for amplifying its output to the photo signal amplifier 75, comprising essentially two pentodes or five element vacuum tubes 121 and 122. For smoothing the ripples in this rectified power circuit, there is provided a filter 123 comprising a choke 124 and a shunt condenser 125. Interconnected between the common conductors 105 and 106 is a voltage divider or potentiometer 126, an adjustable point thereof being connected through a conductor 127 and a resistor 128 to a plate 129 of the tube 121 constituting the first stage of the amplifier 75. The positive potential conductor 106 is connected through a resistor 130 and a branch conductor 131 to a plate 132 of the vacuum tube 122 that constitutes the second stage of the photo signal amplifier 75.

A cathode 138 of the tube 122 is connected through branch conductors 139 and 140 to an adjustable point of the potentiometer 126, and a cathode 141 of the tube 121 is connected through a conductor 142 to an adjustable point of a second potentiometer 143 that is, in turn, interconnected between a fixed point of the potentiometer 126 and the common conductor 105. The screen grids and suppressor grids of both the tubes 121 and 122 are connected in well known manner to perform their usual functons. The filaments of the tubes are energized by a pair of secondary windings 144 and 145, that, in turn, are energized by the primary coils 85 and 86, respectively.

The normally non-conductive photoelectric cell 70 is disposed to control the signal output of the amplifier 75 by having its cathode 148 connected by a conductor 149 through a resistor 150 to the common conductor 105 or ground, as well as to a branch conductor and a resistor 151 leading to the control grid 152 of the first amplifying tube 121. An anode 155 of the photocell 70 is connected through a conductor 156 to an adjustable point of the potentiometer 126. The first amplifying tube 121 therefore, is normally non-conductive since the potential of its control grid 152 is normally retained at ground level. As a result, the second amplifying tube 122 is normally conductive since its control grid 157 is connected by means of a conductor 158 through a protective resistor 159 to the plate circuit of the tube 121. With the second amplifier tube 122 conducting anode current, the potential of the signal output conductor 160 leading from the plate 132 will normally be continuously maintained in the vicinity of the voltage level of the cathode 138.

Whenever a light beam signal or a light impulse activates the photoelectric cell 70, however, the potential of the signal output conductor 160 will be raised (made more positive) toward the anode voltage supply level. During a normal copying operation, the photoelectric cell 70 is energized at recurring intervals by a continuous succession of light beam pulses. As a result, the amplifier 75 will be activated to magnify the voltage change of the photo signal and cause the output conductor 160 to swing voltage-wise toward the positive at recurring intervals, and thus produce a continuous succession of signal voltage pulses for selectively activating the translator 76, indicated by the dotted lines in Fig. 3.

These signal voltage pulses are velocity signal voltages, and in addition to activating the translator 76, when the record is being made they are also being carried by branch conductors 165 and 166 for the purpose of being recorded in a manner to be subsequently described. The branch conductor 165 is connected to the signal output conductor 160 and the branch conductor 166 is connected to a conductor 167 leading from the potentiometer 126 to the translator 76.

For the purpose of activating the translator 76, the recurring signal voltage pulses emanating from the amplifier 75 are disposed to control the operation of four vacuum tubes 170, 171, 172 and 173 constituting a major portion of the translator 76 for effecting the required directional feeding movement of the coordinately movable pattern support 40 and work table 19. As shown in Fig. 3, the translating tubes, which are of the three element type known as triode pliotrons, are designated N, W, S, and E, and are individually operative to selectively control the energization of the feed motors 28 and 29 for moving the saddle and work table along a north, west, south or east direction of travel. To selectively activate the tubes 170, 171, 172 and 173, a control circuit is established from the amplifier 75 through the signal output conductor 160 which is connected to the respective terminals of four normally closed switches 177, 178, 179 and 180. From the switches, the circuit continues through four branch conductors 181, 182, 183 and 184 respectively, connected through a resistor interposed in each line to the four control grids 185, 186, 187, and 188 of the north, west, south and east translating tubes. The potential of the four control grids 185, 186, 187 and 188 will thus swing toward the positive to enable all four tubes to pass current in response to the amplified control signals received through the signal input conductor 160. Although all of the tubes will then be ready to pass current, only those having their plates positive at that particular instant will be actually operative to pass current.

For effecting a selective response to control signals provided by the single photoelectric cell 70, the four tubes 170, 171, 172 and 173 of the translator 76 are arranged to be sequentially operative in overlapping relationship, and in such a manner as to constitute an electrical commutating timing circuit that operates in synchronism with the rotating shutter head 50. To effect this result, there is provided a second pair of Scott connected transformers 195 having a pair of primary coils 196 and 197 connected to receive current from the three phase power lines 79, 80 and 81 in a manner to provide two phase alternating current to the translating tubes. An infinitely adjustable transformer 198 of the type known as a variac, is operatively interposed between the Scott connected transformers 195 and the three phase supply lines for controlling the voltage to the primary coils 196 and 197, and thus serve as a variable speed device for selectively varying the feeding rate of the motors 28 and 29.

Current for activating the north and south tubes 170 and 172 of the translator 76 is derived from a pair of secondary windings 201 and 202 that are energized by the primary winding 196 to establish a related single phase from the three phase alternating current supply lines. From the opposite outer ends of the secondary windings 201 and 202, current is conducted through a pair of conductors 203 and 204 connected directly to the anodes or plates 205 and 206 of the north and south tubes. The cathodes 207 and 208 of these tubes are connected through a common conductor 209 to the mid-point of a resistor 210 interconnected between the inner ends of the secondary windings 201 and 202.

In a similar manner, current for activating the east and west tubes 173 and 171 is derived from a pair of secondary windings 217 and 218 that are energized by the primary winding 197 in a manner to establish a related second phase from the alternating current supply lines, the second phase being displaced 90° from the first phase provided for the north and south tubes. From the secondary windings 217 and 218, current is transmitted through a pair of conductors 219 and 220 connected to the anodes 221 and 222 of the east and west tubes. The respective cathodes 223 and 224 of these tubes are connected through a common conductor 225 to the mid-point of a resistor 226 interconnected between the secondary windings 217 and 218 of the second of the Scott connected transformers 195. The filaments of the east and west tubes are respectively connected to a pair of coils 227 and 228 that are energized by the primary winding 197. In like manner, the filaments of the north and south tubes are respectively connected to a pair of coils 229 and 230 that are energized by the primary winding 196.

Figure 5:
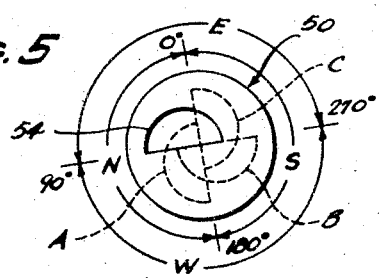
Fig. 5 is a diagrammatic view illustrating the timing relationship of the operation of control mechanism shown in Fig. 2 with the electrical control circuit shown in Fig. 3.

By means of this arrangement, the plates of the respective translating pliotrons are phased in electrical quadrature relative to the synchronously rotating shutter head 50, as more clearly represented in Fig. 5. The D-shaped copy aperture 54 is there shown in four different positions, spaced 90° apart, and respectively representing the exact orientation of the rotating shutter head 50 at the instant the corresponding pliotron plates 205, 222, 206 and 221 are at their maximum positive voltage. The plate 205 of the north pliotron 170 is positive from 0° to 180°, represented by the angle N in Fig. 5, and reaches its maximum positive potential at the instant the copy aperture sweeps through a position indicated by the solid lines. In a similar manner, the copy aperture is indicated in dotted line positions A, B and C which coincide in time with the exact instant the respective plates 222, 206 and 221 of the west, south and east pliotrons reach their maximum positive voltage.

The west pliotron plate 222 is positive from 90° to 270°, represented by the angle W; the south pliotron plate 206 is positive from 180° to 360°, represented by the angle S; and, the plate 221 of the east pliotron 173 is positive from 270° to 90°, as shown by the angle E. Since the translating tubes 170, 171, 172 and 173 are conductive whenever the respective plates thereof are at positive potential, these tubes will therefore be sequentially operative in overlapping relationship. For each cycle corresponding with one revolution of the shutter head 50, one of the tubes, for example, the north tube will be operative (insofar as plate voltage is concerned) for 180°, and the two adjacent tubes, the east and west tubes will be operative during this time interval for 90°; the 90° representing the overlap of the respective phases.

Whenever the rotating shutter head 50 passes a light pulse signal, the photocell 70 will be energized to provide an amplified input signal for causing the four control grids 185, 186, 187 and 188 of the translating tubes to swing toward the positive. If the plate 205 of the north tube 170 is positive at that particular instant, the north tube will be operative to pass current representing an output reference voltage pulse that is operative to effect coordinate northward feeding movement of the pattern and workpiece. Assuming that the major direction of pattern movement at that particular instant is north, and that the duration of the input signal to the control grids is 90°, the east and west tubes will likewise pass current due to their overlapping relationship with the north tube. With the east and west tubes passing current for exactly equal periods of time, approximately 45°, the normal motor controlling effects of the reference output voltages therefrom are cancelled to prevent lateral movement of the pattern either toward or away from the major northward path of travel.

To selectively control the reference output voltage pulses from the tubes 170, 171, 172 and 173, the translator is provided with four shunt condensers 238, 239, 240 and 241 respectively connected across the output of the tubes. The north condenser 238 is interconnected between the common conductor 209 and a conductor 242 in a manner to become charged whenever the north translating tube 170 is conductive. The south condenser 239 is interconnected between the common conductor 209 and a conductor 243 in a manner to become charged whenever the south tube 172 is passing current. In like manner, the east and west condensers 240 and 241 are interconnected between the common conductor 225 and a pair of conductors 244 and 245 in such a manner as to become charged in response to signal output pulses from the east and west tubes respectively. The east and west condensers 240 and 241 are operatively connected through a pair of output conductors 246 and 247 to selectively activate the east and west motor controller 77, and the north and south condensers 238 and 239 are connected through a pair of output conductors 248 and 249 to selectively activate the north and south motor controller 78.

The north and south condensers 238 and 239 are disposed to cooperate in such a manner as to supply an output reference signal voltage of the required potential and polarity to a reference voltage divider 255, shown in Fig. 4 and comprising two resistors 256 and 257 connected in series between the opposite ends of the conductors 248 and 249. The potential across the two resistors 256 and 257 constituting the north and south reference voltage divider 255 varies according to whichever of the condensers 238 and 239 has been preponderantly charged in response to output voltage pulses from the north and south translating tubes respectively. The north and south motor controller 78 is, in turn, selectively activated to energize the saddle feed motor 28 for either clockwise or counterclockwise rotation at a required speed in accordance with the potential and polarity of the output signal voltage across the reference voltage divider 255.

In a similar fashion, the east and west condensers 240 and 241 are disposed to cooperate in a manner to transform output voltage pulses from the east and west translator tubes into a reference signal voltage that is fed across a reference signal divider 258 comprising a pair of resistors 259 and 260 interconnected between the conductors 246 and 247. As the potential and polarity of the output signal voltage across the reference divider 258 is resultantly varied, the east and west motor controller 77 will be correspondingly activated to energize the table feed motor 29 for rotation at the required speed in either a clockwise or counterclockwise direction. Whenever the pliotrons of the translator 75 are not conducting, any charge remaining on the signal control condensers of the translator is dissipated through the bleeding resistors 210 or 226. Another shunt bleeding path for dissipating condenser charges is provided by the reference voltage dividers 255 and 258.

Power for energizing the motor controllers 77 and 78 is derived from a third pair of Scott connected transformers 265 having primary windings 266 and 267 respectively, connected to be energized by the three phase alternating curent supply lines 79, 80 and 81. A pair of secondary windings 268 and 269 energized by the primary winding 267 are connected to supply single phase alternating curent for energizing a pair of gas filled tubes 270 and 271 of the type known as thyratrons and that are selectively operative to supply rectified direct current of the proper polarity to energize the saddle feed motor 28 for clockwise or counterclockwise rotation. From the opposite ends of the secondary windings 268 and 269, current is transmitted through a pair of conductors 272 and 273 connected to the anodes 274 and 275 of the north and south thyratrons respectively. From a cathode 280 of the north tube 270, a power circuit may be established to a branch conductor 281 extending to a branch conductor 282 that is connected to one armature terminal of the north and south or saddle feed motor 28. From the other armature terminal of the feed motor 28, the circuit is completed through a conductor 283 connected directly to the secondary winding 268.

From the cathode 287 of the south tube 271, a power circuit may be established through the conductor 283 leading to one armature terminal of the saddle feed motor 28, and thence from the other armature terminal through the conductor 282 to the inner end of the secondary winding 269, the opposite end of which is connected to the plate 275 through the conductor 273.

Power for the east and west motor controller 77 is derived from a pair of secondary windings 288 and 289 energized by the primary winding 266 of the Scott connected transformer 265 in a manner to supply single phase alternating current (90° displaced with respect to the secondary windings 268 and 269) to a pair of gas filled tubes or thyratrons 290 and 291 that are selectively operative for supplying rectified direct current to energize the table feed motor 29. From the secondary windings 288 and 289, current is transmitted to the plates 292 and 293 of the east and west thyratrons 290 and 291 through a pair of conductors 294 and 295 respectively. From a cathode 296 of the east tube, a power circuit may be established through a branch conductor 297 and a conductor 298 to one armature terminal of the table feed motor 29. The circuit then continues from the other armature terminal through a conductor 299 leading directly to the secondary winding 288. A cathode 305 of the west tube 291 is connected through a branch conductor 306 and conductor 299 to one terminal of the table feed motor armature, and thence continues from the other terminal of the table feed motor armature to the conductor 298 extending to the inner end of the secondary winding 289, the opposite end of which is connected to the plate 293 of the west tube. The filaments of the north and south thyratrons are activated by a pair of coils that are respectively energized by the primary windings 266; and, the filaments of the east and west thyratrons are activated by a pair of coils that are respectively energized by the primary windings 267.

The Scott connected transformers 265 supply two phase current to the four thyratrons so that the respective plates 274, 293, 275 and 292 thereof are disposed to be sequentially positive in overlapping relationship in a manner similar to the respective plates of the four translating tubes 170, 171, 172 and 173. Although the thyratron plates are thus spaced in electrical quadrature, the plate voltage to the individual thyratrons is disposed to lead the plate voltage to the coresponding pliotrons of the translator 76 by 90°. Assuming, that the plate 205 of the north translating tube 170 is positive from 0° to 180°, then the plate 274 of the corresponding north thyratron 273 will be positive from 270° to 90°.

Since each of the motor controllers 77 and 78 operates in like manner in response to signal output control voltages across the respective reference voltage dividers 255 and 258, only the east and west controller 77 for effecting selective energization of the table feed motor 29 will be described in detail. The east and west thyratrons 290 and 291 are disposed to be selectively activated in accordance with the potential and polarity of the input control voltage across the reference divider 258, and also in accordance with the potential and polarity of a control voltage across a feed back control 310. The feed back control 310 comprises three resistors 311, 312 and 313 interconnected in series between the main supply conductors 298 and 299 leading to the armature terminals of the table feed motor 29. Whenever the motor 29 is rotating, it generates a counter E.M.F. that develops a feed back voltage across the feed back control 310, and that operates conjunctively with the input reference voltage across the reference voltage divider 258 to effect a precise speed regulation of the motor 29.

From a center tap of the resistor 312 constituting part of the feed back control 310, the circuit is completed through a conductor 314 leading to a tap on a resistor 315, and thence through a conductor 316 interconnected between one terminal of the resistor 315 and a mid-point of the reference voltage divider 258. The resistor 315 is disposed to supply a direct current grid bias voltage of predetermined value that is energized through a pair of conductors 317 and 318 leading to the output terminals of a direct current rectifier bridge 324. The rectifier bridge, in turn, is energized through a pair of conductors 319 and 320 leading to a secondary winding 321 that is energized by a primary winding 322 of a fourth pair of Scott connected transformers 323 that provide two quadrature phases from the three phase main supply lines 79, 80 and 81, the other phase being distributed from a primary winding 324 to corresponding components of the north and south motor controller 78.

A grid circuit for the east thyratron 290 is established from the cathode 296 thereof, through the conductors 297 and 298, thence through the rightward half of the feed back control 310 through the conductor 314. From the conductor 314, the grid circuit continues through the grid bias resistor 315, the conductor 316, and through the lower half of the reference voltage divider 258 through a conductor 330 connecting directly with one terminal of a secondary winding 331 of a transformer 332 energized by one of the Scott connected transformers 323. The circuit extends from the opposite terminal of the secondary winding 331 through a secondary winding 328 of a transformer 329 and thence through conductor 333 and a resistor 334 to a control grid 335 of the east thyratron 290.

In a similar manner, a grid circuit for the west thyratron 291 is established from the cathode 305 thereof through the conductor 306 and the conductor 299, through the leftward half of the feed back control 310 to the conductor 314. The circuit then continues from the conductor 314 through the grid bias resistor 315, and the conductor 316 connected to the midpoint of the reference voltage divider 258 and through the upper half thereof to a conductor 336. The conductor 336 is connected to a secondary winding 337 of a transformer 338, and which, in turn, is connected to a secondary winding 342 of a transformer 343. The secondary winding 342 is connected through a conductor 339 and a resistor 340 to a control grid 341 of the west thyratron 291.

The transformers 332 and 338 are provided with a pair of primary windings 348 and 349 and are adjustably connected to be energized by a secondary winding 350 that, in turn, is energized by the primary winding 322 of the Scott connected transformers 323. The transformers 332 and 338 are disposed to be so energized as to provide a predeterminately adjusted phase shunt arrangement, operable in a manner that the secondaries 331 and 337 provide a lagging A.C. grid component of proper potential and phase relationship to the control grids of the east and west thyratrons, respectively. The respective A.C. voltages supplied by the secondary windings 331 and 337 to the control grids 335 and 341 of the east and west thyratrons are disposed to lag the anode voltages of the respective tubes by approximately 90°. The net effect of the lagging A.C. voltage component to the control grids 335 and 341 is to make the thyratrons 290 and 291 controllable over most all of the half cycle of conduction and thereby provide proper response to instantaneous changes in grid potential that exceed the critical grid voltage.

The D.C. negative bias voltage component supplied in each of the grid circuits by the drop across the resistor 315 is operative to control the thyratrons 290 and 291 by permitting limited firing for each, whenever the motor controller 77 is not being activated by the east and west translating tubes 173 and 171. With this condition existing, there is no signal voltage across the reference voltage divider 258 and no control voltage across the feed back control 310, whenever the motor 29 is not rotating to generate a counter E.M.F. During this quiescent state, however, it is essential that the armature of the feed motor 29 be instantaneously responsive to unidirectional current supplied through the conductors 298 and 299 in the event the signal voltage suddenly appears across the reference voltage divider 258. To this end, direct current pulses of reversing polarity and very low magnitude are continuously applied to the armature of the table feed motor 29 whenever the motor controller 77 is at rest. To effect this result, the negative grid bias voltage across the resistor 315 is so adjusted as to permit each of the thyratrons to fire very late in their respective cycles in a manner to supply alternating current of a very low magnitude, approximately 30 volts, to the table feed motor armature. It will be noted that, with the thyratrons 290 and 291 firing alternatively in each cycle, they operate conjunctively to produce a continuous succession of reverse polarity direct current pulses of sufficient magnitude to just balance the static friction of the feed drive but not great enough to cause motor rotation.

Each alternative direct current pulse thus supplied is of opposite polarity, in a manner that the continuous succession of pulses constitute, in effect, an alternating current of low voltage. The D.C. current pulses alternatively produced by the thyratrons 290 and 291 are balanced in potential and polarity and are of insufficient value to effect any movement of the feed motor 29. These current pulses, however, do oscillate in time with the periods during which a particular tube may be caused to conduct current for energizing the feed motor. Whenever there is a signal input voltage across the voltage reference divider 258 therefor, one or the other of the thyratrons 290 or 291 will fire earlier than it normally would be caused to fire by the grid bias voltage across the resistor 315 alone. The larger D.C. current pulse resultantly passed by that particular tube, in turn, operates to effect immediate movement of the feed motor armature in the required direction of rotation.

The motor controller 77 is thus disposed to respond immediately to input reference signals across the reference voltage divider to effect immediate energization of the table feed motor 29 for rotation in either a clockwise or counterclockwise direction. To obtain an extremely close regulation of speed, the counter E.M.F. generated by the rotating motor 29 is applied across the feed back control 310 in a manner to effect deenergization of the motor armature as soon as the motor speed matches the speed called for by the input signal voltage. If the motor speed exceeds the required speed, the counter E.M.F. across the feed back control 310 is disposed to exert a plugging action on the motor 29 in order to decrease its speed sufficiently to exactly conform to the requirements of the input signal voltage across the reference voltage divider.

To retain the edge of the continuously moving pattern a fixed normal distance from the axis of the shutter head 50, the scanning device 42 is operative to urge the guiding line of trace toward and away from the axis of the shutter head 50 alternatively during each cycle. The alternative motor torque pulses for motion toward and then away from the shutter head occur with such rapidity during the small increment of feeding advance for one cycle, that the workpiece is steadily and uniformly advanced without lateral displacement along an unwavering path of movement during repetitive cycles of operation. If the pattern is being moved along a straight path of travel, these motor torque pulses for motion toward and away from the axis of the shutter head 50 will be in exact balance, and this state of equilibrium will prevail during repetitive cycles of operation.

If, however, the pattern is being moved along a curved path of travel, the motor torque pulse for motion away from the shutter head will be either greater or smaller in duration than the initial pulse toward the shutter head, depending upon the exact direction of movement dictated by the pattern. The change in balance between the respective motor torque pulses for motion toward or away from the shutter head provides the necessary lateral correction to constantly maintain the path of travel of the continuously moving pattern in exact correspondence with the configuration of the guiding contour. The translator 76 functions in such a manner as to tend to re-establish equilibrium between the respective motor torque pulses for motion toward and away from the axis of the shutter head. Since the edge of the moving pattern is thereby continuously maintained in a fixed normal distance from the axis of the shutter head, the rotating copy aperture 54 overlaps a straight edge thereof by substantially the same amount during repetitive cycles.

As schematically shown in Figs. 6, 7 and 8, the pattern 58 is represented as being moved in a westward direction relative to the continuously rotating copy aperture 54. To effect lateral correction of the edge 59 of the westwardly moving pattern 58 relative to the axis of the shutter head 50, the duration and angular orientation of a copy light pulse passed by the copy aperture 54 is disposed to vary in accordance with the distance of the pattern edge 59 from the axis of the shutter head 50, as well as its angular orientation relative thereto. Copy light beam signals varying slightly in duration activate the translator 76 to effect the necessary lateral correction with respect to the line of trace, as indicated by the sine waves representing the overlapping thyratron grid voltages of the translator 76 as shown in Figs. 6a, 7a and 8a.

For purposes of simplification, only the upper or positive half waves of the overlapping sine waves are shown in the drawings. To more clearly illustrate the lateral correcting effect of the copy aperture 54, the pattern 58 is represented in Figs. 6 and 8 as being bodily displaced an unduly large amount from the path of westward movement it would normally follow, and as shown in Fig. 7. The eccentricity of the copy aperture 54, as well as the relative activation of the translator pliotrons, Figs. 6a, 7a and 8a are correspondingly exaggerated to emphasize the corrective movement of the pattern with respect to the normal line of trace. In operating the machine to traverse a perfectly straight line of trace, however, it is to be noted that the exaggerated conditions would not usually occur.

As shown in Fig. 7, the edge 59 of the pattern 58 delineating the major path of movement at that instant is always maintained perpendicular to a line 355 extending radially outward from the axis of the shutter head 50, and that may be referred to as a normal line denoting the major axis perpendicular to feed. This relationship exists irrespective of angular changes in the contour of a guiding pattern that may require a corresponding directional change in the path of travel, and is determinative of the angular orientation of the rotating shutter head 50 the instant it passes a copy signal light beam. As shown in Fig. 7, the copy aperture 54 is shown in overlapping relationship with the pattern edge 59 that represents an average or median position as it sweeps through an arc of movement to pass a copy light signal pulse for effecting movement of the pattern along a westward path of travel, the dotted area adjacent the pattern edge 59 representing the degree of overlap.

It will be noted that the average position of the copy aperture 54 represented by the solid lines is skewed slightly ahead of the normal line 355 by a certain angle P that may be referred to as the phasing angle. Although the phasing angle P may vary slightly, the most satisfactory results are obtained by predeterminately establishing its value at about 20°. The exact instant the copy aperture 54 begins to overlap the pattern edge 59 to pass light, as well as the instance it sweeps back over the pattern edge to terminate the light pulse, is determined by the phasing angle. Referring to Fig. 7, the westwardly moving pattern 58 is so located with respect to the rotating shutter head 50, that the copy aperture 54 will sweep through an arc of approximately 90° represented by the angle F, as it overlaps the guiding edge 59. This is the normal duration of a copy signal light pulse whenever a straight line of trace is being traversed. As the rotating copy aperture sweeps through the dotted line position A, the leading edge thereof will begin to overlap the pattern edge 59 to initiate a copy signal light pulse. This light pulse continues as the copy aperture 54 sweeps through its average position, indicated by the solid lines, and is terminated at the instant it moves back under the opaque portion of the pattern 58, as indicated by the dotted lines B. The copy signal light pulse is terminated by movement of the circular or trailing edge of the copy aperture 54 back across the pattern edge 59 and into the opaque zone. The distance between the points on the edge of the guiding pattern at which a copy signal light pulse is respectively initiated and terminated constitutes an edge zone of the pattern for controlling the direction of movement. Since the degree by which the copy aperture 54 overlaps the pattern edge is extremely slight, each succeeding overlapping edge zone of the pattern is extremely short in length. The exact length of each overlapping edge zone is a function of the feeding rate.

The copy signal light pulse passed as the copy aperture 54 sweeps through the angle F will activate the north, west and south tubes of the translator 76, as shown in Fig. 7a. As there shown, the amplified signal from the amplifier 75 is represented as a square wave having a duration of approximately 90°, and that is superimposed on the overlapping positive half wave of the translator tubes occurring during one cycle. It will be apparent that the leading edge 356 of the signal coincides in time with the initiation of the light pulse as the copy aperture 54 sweeps through its dotted line position A. The rearward edge 357 of the signal coincides in time with the termination of the light pulse as the copy aperture sweeps through the dotted line B under the opaque zone. Within the duration of the light pulse, the small sections of the sine waves represent the period during which the south and north condensers 238 and 239 are charged, as indicated by the shaded areas in Fig. 7b. The north and south condensers being charged equally, there will be no lateral movement of the pattern 58 with respect to its westward path of movement, since no lateral correction is required.

Inasmuch as the north and south condensers are charged sequentially, however, there will be a resulting imperceptible voltage difference pulse to call for a north movement that is exactly balanced by a voltage difference pulse calling for south movement. The pattern edge 59 is thereby urged in a northward direction toward the axis of the shutter head 50, and, alternatively, in a south direction away from the shutter head 50. During repetitive cycles, these impulses alternate with such rapidity that there is no perceptible movement either toward or away from the shutter head 50. Within the duration of the copy signal light pulse, Fig. 7a, the west translating tube 171 is simultaneously conductive to charge the west condenser 241, as indicated by the shaded area, in Fig. 7c, for effecting continued feeding movement of the pattern 58 in a westward direction.

As shown in Fig. 6, the pattern edge 59 is represented as being too far away from the axis of the shutter head 50, and the rotating copy aperture 54 sweeps into overlapping relationship with the line of trace to pass a copy signal light pulse that is shorter in duration as indicated by the angle H. With this condition existing, the pattern 58 will be urged to move northward to effect the necessary lateral correction at the same time it is being displaced along the major westward path of travel. The sections of the overlapping sine waves within the duration of the copy signal light pulse Fig. 6a, indicate the relative time that the north, west and south translating tubes are conductive.

Due to the particular configuration of the copy aperture 54, it will be noted that the leading edge 358 of the amplified square wave signal recedes slightly, while the trailing edge 359 is advanced by a somewhat greater amount. As indicated by the shaded areas in Fig. 6b, the north condenser 238 will then be charged voltage-wise to a greater extent than the south condenser 239, and the pattern will be urged northward until its guiding edge 59 coincides with its normal position, indicated by the dotted line 360 in Fig. 6, during a westward path of movement. As shown by the shaded area, Fig. 6c, the west condenser will be simultaneously charged to a voltage for effecting continued westward movement.

In similar manner, if the guiding edge 59 of the pattern 58 is too close to the axis of the shutter head 50, as shown in Fig. 8, the copy aperture 54 operates to effect lateral correcting movement in a southward direction. With this condition existing, the rotating copy aperture 54 will overlap to pass a proportionately longer copy signal light pulse as it sweeps through the angle G. The north, west and south translating tubes are conductive during the copy light pulse, indicated in Fig. 8a, to charge the north, west and south condensers respectively, as indicated in Figs. 8a and 8c. With the south condenser charged preponderantly, the pattern 58 will be moved southward until the edge 59 thereof coincides with its normal position, indicated by the dotted line 360 in Fig. 8 during a westward path of travel.

Due to the configuration of the copy aperture 54, the leading edge 361 of the amplified square wave copy signal is advanced by a lesser amount than the rearward edge 362 thereof is extended. Irrespective of angular changes in the line of trace relative to the shutter head 50, the instant at which the light pulse signal is initiated varies a lesser amount than the instant at which the signal is terminated. The trailing or circular edge of the copy aperture 54 is more sensitive to directional changes in the line of trace, and operates to shorten or extend the duration of a particular copy signal light pulse in accordance with the requirements of the guiding contour.

To facilitate movement of a pattern into guiding relationship with the scanning device 42, the feed motors may be selectively energized by a manually movable toggle lever (not shown) that is mounted for pivotal movement to selectively actuate one or another of the normally closed switches 177, 178, 179 or 180 that are operatively interconnected between the signal output conductor 160 and the control grids of the respective pliotrons of the translator 76. Actuating one or the other of the switches operates to selectively disconnect a respective pliotron control grid from the automatic feed signal conductor 160, and, in turn, operates to connect that particular control grid to a common conductor 366 connected to the common cathode conductors 209 and 225. The translating pliotron controlled by that control grid, in turn, is conductive to effect feeding movement of the work table 19 and pattern support 40 in the selected direction of travel.

As previously mentioned, the square wave pulses produced by the photoelectric cell 70 may be recorded while the pattern 58 is being scanned for the purpose of being subsequently reproduced to control the machine in the same manner as when the pattern was being scanned. The recorded square wave pulses when reproduced, may be fed into the translator 76 in the same manner as the original pulses were, for controlling the operation of the feed motors 28 and 29, so that the movement of a workpiece on the table 19 relative to the cutter 22 will be approximately repeated without the benefit of the pattern. The control system for accomplishing this is illustrated diagrammatically in Fig. 1, where the signal voltages are shown as being recorded on a magnetic tape 375, which is driven by an electric motor 376 to cooperate with a plurality of recording and pick up heads. Although a tape recorder is illustrated as an exemplary embodiment, it is to be understood that other memory devices may be employed without departing from the spirit and scope of the invention.

In order to record the square wave pulses of the photoelectric cell 70, they are amplified by the amplifier 75, and then transmitted by the conductors 165 and 166 to an attenuator and oscillator circuit 380 illustrated diagrammatically in Fig. 1. The attenuator circuit is constructed in well known manner to diminish the voltage of the square wave signal received from the amplifier 75 to a desired value. In like manner, an oscillator of well known construction is connected to supply the oscillator frequency to a recording head 381 under the control of the square wave pulses of the photoelectric cell 70 for the purpose of recording the frequency on the tape 375. The square wave pulses function to actuate an electronic switch (not shown) in the oscillator circuit so that the oscillator frequency will be recorded on the tape 375 during the duration of each square wave pulse, but will not be recorded during the intervals between the pulses. Since, as previously explained, the square wave pulses produced by the photoelectric cell 70 are of approximately 90° duration (shutter head angular measurements) with a 270° interval between pulses, the oscillator frequency will be recorded on the tape 375 for an approximate 90° interval during each revolution of the shutter head. During the approximate 270° interval between pulses, nothing will be recorded on the tape.

After the square wave pulses of the photoelectric cell 70 have been recorded in this manner during the operation of the machine, the record may be played back to reproduce these pulses which can be applied to the translator 76 to control the feed motors 28 and 29 in the same manner that they were controlled when the record was made, to repeat the operation. To play back the record, a switch 385 is actuated to disconnect the attenuator and oscillator circuit 380 from the recording and pick up head 381 and to connect the latter to an amplifier and pulse shaper circuit 386 depicted diagrammatically in Fig. 1 and in detail in Fig. 9. As the tape 375 is moved past the pick up head 381, the oscillator frequency previously recorded on the tape will produce an alternating voltage which is transmitted to an amplifier 387 of the circuit 386. It will be noted that since the oscillator frequency was only recorded during the duration of the square wave pulses, and no frequency was recorded during the intervals between the pulses, the alternating voltages produced from the tape will be in similar pulses of approximately 90° duration with 270° intervening between such pulses. From the amplifier 387, the voltage is transmitted to a pulse shaper 388, which is nothing more than a rectifier bridge connected to receive the amplified A.C. voltages from the amplifier 387 and convert them into D.C. voltage pulses. These D.C. voltage pulses are supplied from the many rectified oscillator half cycles ripple smoothed by a condenser 391 and resistor 392.

Since the voltages from the tape 375 are oscillator frequency pulses, the output of the rectifier 388 will be in the form of square wave D.C. voltage pulses conforming to the square wave D.C. voltage pulses produced by the photoelectric cell 70. This is true because when a voltage pulse is initiated by the recorded data on the tape 375, it is transmitted to the rectifier 388 and a voltage of definite value immediately appears across its output conductors 389 and 390. This voltage across the conductors 389 and 390 will be maintained during the duration of the pulse from the tape 375, but when the pulse is terminated, the voltage across the conductors 389 and 390 drops to zero value. Therefore, the voltage across the conductors 389 and 390 is in the form of a square wave with a maximum D.C. voltage being maintained for approximately 90°, and no voltage appearing for approximately 270°, to form a square wave the same as the original square wave D.C. voltage initiated by the photoelectric cell 70.

These square wave pulses are then transmitted by the conductors 389 and 390 through a switch 395 and thence through conductors 396 and 397 which connect with the conductors 160 and 167 as shown in Fig. 3 to the translator 76 where they function in the same manner as the original square wave signal voltage pulses initiated by the photoelectric cell 70, to control the operation of the feed motors 28 and 29. As shown in Fig. 1, the conductor 397 is interrupted by a switch 398 which is closed whenever the motor 376 is operating so that the circuit is completed whenever the tape 375 is moving to produce the signal voltages.

As previously explained, the square wave signal voltages introduced into the translator 76 are velocity signal voltages which determine the speed of the feed motors 28 and 29 at any particular instant in the operation. They therefore serve to control energization of the motors at a given instant to reproduce the same energization produced at the corresponding instant when the record was made. If these recorded velocity signal voltages were used exclusively for play back, errors would occur in the operation when the machine is under the control of these velocity signal voltages if the loads on the motors at any given instant in the operation are different from the loads existing at the corresponding instant when the record was made. Such variances in the loads may occur as a result of different conditions existing due to changes in the frictional resistances of the moving parts, cutting loads and other factors.

In order to avoid such errors, the control system of the present invention includes the production of position signal voltages which are recorded on the tape 375 with the velocity signal voltages to establish a record of the position of the saddle 18 and table 19 at any instant in the operation. Upon play back of the record, the position signal voltages then function as a supplementary velocity control, to modify the velocities of the saddle 18 and table 19, if the velocities established by the velocity control signals fail to produce the proper position of these members as existed at the same instant when the record was made.

The arrangement for producing the position signal voltages as illustrated diagrammatically in Fig. 1 is of a type well known in the art employing synchros for establishing the position of the movable members. To this end, a synchro 405 is mounted on the knee 16 for cooperation with the saddle feed motor 28 to indicate the rotor position of the saddle motor 28 at any given instant in the operation. In like manner, a synchro 406 is supported by the table feed motor 29 to indicate the rotor position of the table motor 29 at any given instant in the operation. Each of the synchros 405 and 406 comprise a pair of stationary field coils disposed to cooperate with a rotor which is connected to be rotated by the motor 28 or 29 as it functions to move its associated movable member 18 or 19.

The synchros 405 and 406 are energized from a three phase source represented by the lines 407, 408 and 409, which is connected by conductors 410 to a Scott connected transformer 411. The Scott connected transformer 411 converts the three phase voltages into two single phase voltages, 90° out of phase with each other. One of these voltages is transmitted by a pair of conductors 412 through a switch 413, and a pair of conductors 414 to the rotor (not shown) of the synchro 405 associated with the saddle feed motor 28. In like manner a second voltage, 90° out of phase with the voltage carried to the synchro 405, is transmitted from the Scott connected transformer 411 through a pair of conductors 418, a switch 419, and thence through a pair of conductors 420 to the rotor (not shown) of the synchro 406 associated with the table feed motor 29.

The respective quadrature related single phase voltages impressed upon the individual rotors of each of the synchros 405 and 406 serve to induce corresponding single phase voltages in the respective field coils of each synchro. The R.M.S. magnitude of single phase voltage induced in one field coil of each synchro is sine-cosine related with the R.M.S. magnitude of the same single phase voltage induced in the other field coil of the same synchro. Furthermore, the respective R.M.S. magnitude of single phase voltage induced in each of the right angle positioned field coils of the synchros at any instant, is a function of the rotary position of the particular rotor associated respectively with each of the feed motors 28 and 29. These two pair of quadrature phase related, each sine-cosine related, synchro output position signal A.C. voltages are recorded, and preserve the instant two dimensional positions of cutter axis and shutter axis with respect to work and pattern in synchronized relationship with the two velocity signal voltages which are recoverable (on playback through translator) from the square wave pulse signal simultaneously recorded.

Since the synchros 405 and 406 function in the same manner, in association with the saddle motor 28 and table motor 29 respectively, it is only necessary to describe the operation of one of them. Thus, the rotor of the synchro 406 is energized by the single phase voltage from the Scott transformer 411 as previously described. The R.M.S. magnitude of single phase voltage from the rotor is induced into the field coils of the synchro 406 with the voltage of one field coil being sine-cosine related with the R.M.S. magnitude of the same single phase voltage in the other field coil. The rotor is connected to be revolved by the table feed motor 29 as the latter operates to actuate the table 19 in its path of travel. As the rotor is thus revolved, the R.M.S. magnitudes of single phase voltage induced in each of the field coils will vary in sine-cosine fashion, since the R.M.S. magnitudes of these single phase voltages are a function of the rotary position of the rotor. In the final analysis therefor, the R.M.S. magnitudes of these field coil voltages are a function of the position of the table motor 29.

The voltage thus induced into one of the field coils of the synchro 406 is transmitted by a pair of conductors 424 to a frequency modulator circuit 425. A carrier voltage of relatively high frequency is fed into the frequency modulator circuit 425 from a carrier oscillator circuit 426, and is modulated in the frequency modulator circuit 425 by the position signal voltage derived from the associated field coil of the synchro 406. The carrier frequency as modulated by the position signal voltage is then transmitted through a switch 429 to a recording and pick up head 430 to be recorded on the tape 375.

In like manner the voltage induced into the other field coil of the synchro 406 is transmitted by a pair of conductors 436 to a frequency modulator circuit 437. A carrier voltage of relatively high frequency is fed into the frequency modulator circuit 437 from a carrier oscillator circuit 438. The frequency modulator circuit 437 and the carrier oscillator circuit 438 are identical in construction and operation to the frequency modulator circuit 425 and the carrier oscillator circuit 426. The carrier frequency from the carrier oscillator circuit 438 is modulated in the frequency modulator circuit 437 by the position signal voltage derived from the associated field coil of the synchro 406. The carrier frequency as modulated by the position signal voltage in the frequency modulator 437 is then transmitted through a switch 439 to a recording and pick up head 440 to be recorded on the tape 375 simultaneously with the voltage being recorded by the recording and pick up head 430.

The switches 429 and 439 are shown connected by a dotted line 441 along with other switches depicted in Fig. 1, to indicate diagrammatically that these switches are all connected for simultaneous operation. To play back the voltages recorded on the tape 375, the switches 429 and 439 are actuated so that the switch 429 engages a contact 442, and the switch 439 engages a contact 443. With the switches thus positioned, the tape 375 may be actuated, and the recording and pick up head 430 will receive the voltages recorded on this cooperating channel. These voltages will then be transmitted through the switch 429 and contact 442 to a discriminator and amplifier circuit 450. The voltage thus taken from the tape 375 will be the carrier frequency as modulated by the position signal voltage from one field coil of the synchro 406. The discriminator portion of the circuit 450 functions to compare the playback frequency with the carrier frequency, to reproduce and amplify the position signal voltage formerly used for modulating. This position signal voltage has then the same R.M.S. magnitude and A.C. polarity as when originally produced by the field coil of the synchro 406, and is carried by a pair of conductors 451 to the conductors 424 for transmission to one field coil of the synchro 406.

In like manner, the other field coil of the synchro 406 is energized by the position signal voltage recovered from the adjacent channel on the tape 375. The played back frequency modulated voltage is received by the recording and pick up head 440 and transmitted through the switch 439 and contact 443 to a discriminator and amplifier circuit 455. The latter functions in the same manner as the discriminator and amplifier circuit 450, to compare the played back frequency with the carrier frequency to reproduce and amplify the position signal voltage formerly used for modulating. This position signal voltage has then the same R.M.S. magnitude and A.C. polarity as when originally produced by the second field coil of the synchro 406, and is carried by a pair of conductors 456 to the conductors 436 for transmission to the other field coil of the synchro 406.

It is to be understood that while the voltages are being received by the recording and pick up heads 430 and 440 to reproduce the position signal voltages, the recording and pick up head 381 is also receiving voltage pulses from another channel on the tape 375, these latter voltage pulses of high frequency being then reconverted by rectification to D.C. square wave pulse velocity signals (the same are originally initiated by the photoelectric cell 70) for transmission to the translator 76 to effect primary velocity control of the machine. Since this square wave velocity signal voltage is controlling the rotational speed of the table feed motor 29 (as well as motor 28) it is also establishing instant rotary positions of the rotor of the synchro 406 by reason of its connection with the motor 29. Therefore, if the square wave velocity signal voltage is producing accurate positioning, the rotor of the synchro 406 will be in the same position relative to its field coils as it was when the position signal voltages (recovered from the record and impressed upon the field coils) were originally produced by induction from the rotor, when the record was being made. Under these conditions, the same voltage would be induced in the rotor, but since the position of the table 19 is accurate, and no position error voltage is desired the rotor of the synchro 406 must be revolved 90° relative to the motor 29 by shifting a lever 457 when playback is initiated, and therefore no position error voltage will be induced in the rotor. The rotor of the synchro 405 is similarly revolved by shifting a lever 458 when playback is initiated to obtain the same result. The table 19 will therefore remain under the control of the velocity signal voltages alone, the position signal error voltage being zero valued if measured across the rotor winding of the synchro 406.

However, as previously stated, the velocity signal voltages will produce substantially the same energization of the motor 29 as they produced at the same instant when the record was made. If for any reason, the load on the motor should vary from the load existing at the same instant when the record was made because of a change in the frictional resistances, cutting load, or for other reasons, the same energization of the motor would not produce the same velocity of the table 19 as existed at the same instant in the operation when the record was made. Therefore, the same position of the table 19 would not be achieved, and an inaccuracy would result if the position signal voltages were not available to modify the velocity of the table 19 and restore its accurate positioning on continued operation.

When such error occurs in the positioning of the table 19 as a result of the control effected by the velocity signal voltages, the rotor in the synchro 406 will likewise be displaced from the null rotary position it should occupy for a zero valued error signal voltage across its rotor winding. Thus, the mismatch in accurate positioning will cause the rotor winding to pick up an error signal voltage from the field flux produced by the field coils as energized in accordance with the recorded data on the tape 375. This error signal voltage is transmitted from the rotor of the synchro 406 by the conductors 420 through the switch 419 which was actuated with the switches 429 and 439 to connect with a pair of contacts 459. From the contacts 459 the voltage is transmitted through a pair of conductors 460 to an amplifier 461 for amplification. The amplified voltage is transmitted through a pair of conductors 462 to the motor control circuit 77 where it serves to modify the velocity control effected by the velocity signal voltage and result in an altered velocity of the table 19 to place it in the same position that it occupied at the same instant in the operation when the record was made.

As illustrated in Fig. 4, one of the conductors 462 is connected to a terminal of a primary winding 463 of the transformer 343, and the other conductor 462 is connected to a terminal of a primary winding 464 of the transformer 329. The other two terminals of the primary windings 463 and 464 are connected together so that the windings are series connected. As a result, they will both be energized simultaneously by the amplified position error signal voltage from the rotor of the synchro 406.

Any voltage across the primary 463 is induced in the secondary winding 342, which is in the grid circuit of the west thyratron tube 291 and operates to aid or oppose the A.C. grid component to the control grid 341 of the west thyratron. In like manner, any voltage across the primary winding 464 is induced in the secondary winding 328 which is in the grid circuit of the east thyratron tube 290 and operates to aid or oppose the A.C. grid component to the control grid 335 of the east thyratron.

As previously explained, the A.C. grid components impressed upon the respective grids 335 and 341 are 180° out of phase with each other by reason of the phase shift network afforded by a resistor 535 and capacitor 536 combination shown in the circuit with the primaries 348 and 349. The A.C. position error signal voltage from the synchro 406 induced in both grid circuits will therefore be in phase with the A.C. grid component of one grid circuit to increase its magnitude, and will be 180° out of phase with the A.C. grid component of the other grid circuit to decrease its magnitude. For this reason, the position error signal voltage has the desired result of increasing the voltage impressed upon one of the grids 335 or 341 while at the same time reducing the voltage impressed upon the other grid for effecting the desired corrective control of the table motor 29 to re-establish the desired accurate positioning of the table 19.

The position error signal voltage from the synchro 405 functions in the same manner to modify the control of the saddle feed motor 28 in response to inaccurate positioning of the saddle 18 by the velocity signal voltages. The position signal voltages from the synchro 405 are transmitted by the conductors 414 to the switch 413, and thence through a pair of conductors 467 to an amplifier 468. After the position error signal is amplified, it is transmitted from the amplifier 468 through a pair of conductors 469 to the saddle motor control circuit 78 to function in the same manner as the position error signal voltage produced by the synchro 406 functions in the table motor control circuit 77.

It is apparent from the above description, that the position error signal voltage whenever produced by the synchros 405 and 406 will function to effect the velocity control of the machine even to the extent of affording complete velocity control, without inclusion of the velocity signal voltages. It will be noted, however, that in order for such a system to operate, a position error signal voltage must exist at all times (to maintain feed motors energized) thus maintaining a mismatch between the magnetic field of the synchros as established by the voltages impressed upon their respective field coils in accordance with the played back record and the rotary position of the rotor. If precise positioning were obtained on playback of the record, no such mismatch would exist resulting in a zero error signal voltage. Under these conditions, zero velocity would be called for and operation of the machine would terminate. It is obvious, therefore, that a continuing error in position of the movable members of the machine must be relied upon under such undesirable control arrangement for the functioning of the position error signal voltages to control the operation of the machine.

On the other hand, the velocity signal voltages, as afforded in this invention and previously explained, do not depend upon an error in positioning for their functioning, but instead, serve to produce energization of the motors at a given instant in the operation substantially identical to the energization produced at the corresponding instant in the operation when the record was made. If the loads on the motors at any given instant in the operation are different from the loads existing at the corresponding instant when the record was made, because of changes in the frictional resistances of the moving parts, cutter loads, or the like, the same energization of the motors will produce a different velocity of the movable members so that their position at that instant will be inaccurate.

For these reasons the control system of the present invention relies upon the recorded velocity signal voltages for the primary control of the feed motors, but provides the recorded position error signal voltages as a supplementary control to modify the velocity of the movable members whenever an inaccuracy occurs in their position at any instant in the operation. With this combination, the feed motors are caused to be controlled in such fashion that the disadvantages of individual (either position alone or velocity alone) signal voltages are eliminated, and upon playback of the record the machine is controlled to repeat the movement of the workpiece relative to the cutter in the desired path of movement with a degree of accuracy not heretofore obtainable.

It is obvious from the previous description that when the machine is under the control of a pattern being scanned by the scanning device 42, the electronic translator 76 constitutes an electrical commutating timing device that operates in exact synchronism with the continuously rotating shutter head 50. In like manner, when the machine is under the control of the recorded data on the tape 375 the translator 76 continues to function as an electrical commutating timing device but then operates in exact synchronism with the timing of the voltage pulses originating from the tape 375. It is therefore essential that the rate of travel of the tape 375 when the record is played back, conform exactly to its rate of travel when the record was made. To this end, the tape drive motor 376 is placed under the control of voltages recorded on the tape to insure against variations in its operation.

Such voltages are preferably recorded on the tape 375 prior to the recording of the signal voltages for controlling the operation of the machine. As depicted in Fig. 1 the single phase voltages are obtained for this purpose from the power lines 408 and 409, and transmitted through a pair of conductors 475 to an attenuator circuit 476 which functions to diminish the power line voltages. From the attenuator 476 the voltage continues through a contact 477 and a switch 478 to a recording and pick up head 479 to be recorded on the tape 375. While these voltages are being recorded, the tape 375 is driven by the motor 376 which receives its energizing voltage from the power lines 408 and 409. This energizing voltage is transmitted from the power lines 408 and 409 by the conductors 475 to a pair of branch conductors 485 connected to a normally closed switch 486. From the switch 486 the flow continues through a pair of conductors 487 to a rectifier unit which serves to convert the A.C. voltage to a D.C. voltage for operation of the D.C. motor 376. The circuit from the rectifier unit 488 comprises a conductor 491 connected to carry the voltage from the rectifier unit 488 to a conductor 492 connected with a terminal 493. From the terminal 493 the flow of the voltage continues through a switch 494 which is in engagement with the contact 493 and then flows through a conductor 495 and a branch conductor 496 to one terminal of the motor 376. From the motor 376 the voltage flows through a conductor 497 to return to its source represented by the rectifier unit 488.

The power line voltage thus recorded by the recording head 479 is utilized for controlling the operation of the tape drive motor 376 when the tape is being driven for receiving the data from the machine, as well as when it is driven for playing the record back to control the operation of the machine. With this arrangement the motor 376 will be operated at the same rate when the record is played back as when it was originally made. Therefore, after the voltages for controlling the motor 376 have been recorded, the switch 478 is actuated to engage a contact 498 and the switch 494 is actuated simultaneously therewith to engage a contact 499, and these two switches are retained in this position, in engagement with the contacts 498 and 499, during the recording of the signal voltages from the machine as well as during the play back of these voltages.

To initiate operation of the tape drive motor 376 under the control of the voltages recorded by the recording head 479, a start button 505 is actuated to complete a circuit for energizing the motor 376 from the power lines 408 and 409 for initiating its operation. At the same time, actuation of the start switch 505 produces energization of a coil 506 to actuate the normally closed switch 486 and break the circuit from the power lines 408 and 409 to the motor 376. However, energization of the coil 506 also serves to close a normally open switch 507 for completing a circuit for controlling energization of the motor 376 from the data recorded on the tape by the recording and pick-up head 479.

The voltage from the tape 375 is received by the pick up head 479 and transmitted therefrom through the switch 478 to the contact 498, and thence to an amplifier and servo control circuit 510. The energizing voltage is transmitted from the servo control circuit 510 to the lower closed contact of the switch 507, and thence through a conductor 511 to the closed contacts of the switch 512. From the switch 512 the voltage continues through a conductor 513 and the conductor 506 to a conductor 514 leading to the coil 506. From the coil 506 the circuit continues through a conductor 515 to the contact 499, and thence through the switch 494 to the conductor 495 leading to one terminal of the motor 376. From the motor 376 the voltage returns to its source through the conductor 497 and a conductor 516, and thence through the closed upper contact of the switch 507 to the servo control circuit 510. Thus, during recording and playback, the tape drive motor 376 is under the control of the recorded voltage to insure operation of the tape 375 at the same speed during the two operations.

It will be noted that the normally open switch 512 is in the circuit for energizing the motor 376 while the normally open switch 398 is in the circuit leading from the pulse shaper 386 to the translator 76. These switches are provided for automatically disconnecting the machine upon the completion of an operation, and are closed by energization of a coil 520. During the recording of the voltage signals from the machine on the tape 375, a switch 521 is closed to close a circuit for carrying current from the power lines 408 and 409 to a pair of conductors 522 which connect with a pair of conductors 523. The conductors 523, in turn, connect with the coil 520 through a normally closed stop switch 524 which may be actuated manually at any time to terminate operation of the machine. With the coil 520 thus energized, the circuit to the motor 376 is completed through the switch 512 for driving the tape during the recording operation.

While the record is being made, a power line voltage is recorded on the tape 375 being carried from the power lines 408 and 409 through conductors 475 to an attenuator 525 which functions to diminish the voltage. From the attenuator 525 the voltage is transmitted through a switch 526 to a recording and pick up head 527 for recording the voltage on the tape 375.

When the record is played back, the switch 521 is opened, and the switch 526 is actuated with the other switches in the circuit to engage a contact 532 connected with an amplifier 533. The voltage is then picked up by the pick up head 527 and transmitted through the switch 526 and the contact 532 to the amplifier 533. From the amplifier 533 the voltage is carried by the conductors 523 to the coil 520 to maintain its energization for retaining the switches 512 and 398 in their closed position. Upon completion of the operation no voltage will appear on the tape 375, in the channel associated with recording and pick up head 527, and the flow of energizing voltage to the coil 520 will be terminated, resulting in the opening of the switches 512 and 398 to terminate operation of the motor 376 and open the circuit to the translator 76.

When it is desired to employ the machine for performing copying operations without utilizing the recording system, the switch 395 may be opened, and a switch 540 closed to close a circuit from the pulse amplifier 75 to the translator 76 through the conductors 160 and 167.

From the foregoing detailed description of an explanation of the operation of the exemplifying control system herein set forth as a practical embodiment of the present invention, it will be apparent that there has been provided an improved control system for controlling a machine from data stored on a record in which velocity signal voltages and position signal voltages are combined for the purpose of utilizing the advantages of each to achieve exceptional accuracy in the control of the machine from the record.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. A method of establishing a record of the operation of a movable machine member comprising, producing a signal voltage in response to the velocity of the machine member at each instant in the operation, producing a signal voltage in response to the position of the machine member at each instant in the operation, recording said velocity signal voltages, producing a carrier voltage of a frequency different than the frequency of said position signal voltages, applying said position signal voltages to modulate said carrier voltage, and recording said modulated carrier voltage, whereby data establishing the velocity and position of the movable member at each instant in an operation will be recorded for subsequent reproduction.

2. A method of establishing a record of the operation of a movable machine member comprising, producing a signal voltage in response to the velocity of the machine member at each instant in the operation, producing a signal voltage in response to the position of the machine member at each instant in the operation, producing a carrier voltage, recording said carrier voltage under the control of the velocity signal voltages so that the recorded voltages are a function of the velocity signal voltages, producing a second carrier voltage of a frequency different than the frequency of said position signal voltages, applying said position signal voltages to modulate said second carrier voltage, and recording said modulated second carrier voltage, whereby data establishing the velocity and position of the movable member at each instant in an operation will be recorded for subsequent reproduction.

3. A method of controlling the operation of a movable machine member comprising, producing a signal voltage in response to the velocity of the machine member at each instant in the operation, producing a signal voltage in response to the position of the machine member at each instant in the operation, producing a first carrier voltage, recording said first carrier voltage under the control of the velocity signal voltage so that the recorded voltage is a function of the velocity signal voltage, producing a second carrier voltage of a frequency different than the frequency of said position signal voltages, employing said position signal voltage to modulate said second carrier voltage, recording said modulated second carrier voltage, reproducing said first carrier voltage from the record, converting the reproduced first carrier voltage into the original velocity signal voltage, applying the reproduced velocity signal voltage to a control circuit to control the velocity of said machine member to perform a specific operation, reproducing said modulated second carrier voltage, demodulating the reproduced second carrier voltage to reproduce the original position signal voltage, and applying the reproduced position signal voltage to modify the control of the velocity signal voltage only when the velocity signal voltage produces inaccurate positioning of the machine member at any instant in the operation, whereby a specific operation may be accurately repeated from the recorded data.

4. A method of controlling the operation of a movable machine member comprising, producing a square wave signal voltage operable to control the velocity of the machine member at each instant in the operation, producing a signal voltage operable to control the position of the machine member at each instant in the operation, producing a first carrier voltage, recording said first carrier voltage under the control of said square wave signal voltage so that the carrier voltage is recorded in pulses at intervals corresponding to the signal voltage, producing a second carrier voltage of a frequency different than the frequency of said position signal voltage, employing the position signal voltage to modulate said second carrier voltage, recording said modulated second carrier voltage, reproducing said first carrier voltage pulses from the record, rectifying said reproduced first carrier voltage pulses to reproduce the original square wave signal voltage, applying the reproduced square wave signal voltage to control the velocity of the machine member to perform a specific operation, reproducing said modulated second carrier voltage, demodulating the reproduced second carrier voltage to reproduce the original position signal voltage, and applying the reproduced position signal voltage to modify the control established by the square wave signal voltage whenever the square wave signal voltage effects inaccurate positioning of the machine member at any instant in the operation, whereby a specific operation may be accurately repeated from the recorded data.

5. In a control system for controlling the operation of a machine member to perform an operation, a sensing device connected to produce a velocity signal voltage in accordance with the velocity of said member at any instant in the operation, a second sensing device connected to produce a position signal voltage in accordance with the position of said member at any instant in the operation, and a recording apparatus connected to record said velocity signal voltage and said position voltage to establish a record of the velocity and position of said machine member at each instant in the operation, whereby the record may be employed for causing the machine member to accurately repeat the operation.

6. In a control system for controlling the operation of movable members of a machine tool, power means connected to actuate said movable members in their respective paths of travel, a sensing device connected to produce a primary signal voltage when the machine is operated to perform a desired operation, a second sensing device connected to produce a supplementary signal voltage in response to the position of said movable members at any instant in the operation, a recording apparatus connected to record said primary and supplementary signal voltages for subsequent reproduction, and a control circuit connected to receive the primary signal voltage reproduced from said recording apparatus to control the operation of said power means and to receive a corrective signal voltage produced by said supplementary signal voltage to modify the control whenever the instant position of a movable member as established by said primary signal voltage is inaccurate, whereby an operation may be accurately repeated from the data on the record.

7. In a control system for controlling the operation of movable members of a machine tool, power means connected to actuate said movable members in their respective paths of travel, a recording apparatus connected to record voltages for subsequent reproduction, a sensing device connected to produce a primary signal voltage when the machine is operated to perform a desired operation and to transmit said primary signal voltage to the recording apparatus to be recorded for subsequent reproduction, a control circuit connected to effect control of said power means for controlling the operation of said movable members and to be actuated by said primary signal voltage from said recording apparatus when the record is played back to produce control of the movable members, and a synchro for each of the movable members, connected to be operated in coordination with the movement of one of said members to produce a supplementary signal voltage in response to the instant position of its associated movable member and to transmit said supplementary signal voltage to the recording apparatus to be recorded for subsequent reproduction, said synchros also being connected to receive the voltage which they produced from the recording apparatus upon playback of the record, to compare them with the instant position of their associated movable members and produce a corrective signal voltage if the instant position of the movable member is inaccurate and transmit the corrective signal voltage to said control circuit to modify the control established by the primary signal voltage and produce the correct positioning of the movable member.

8. In a control system for controlling the operation of movable members of a machine tool, power means connected to actuate said movable members in their respective paths of travel, a record containing recorded data representing a primary signal voltage and a supplementary signal voltage, a control circuit connected to effect control of said power means for controlling the operation of said movable members and to be actuated by said primary signal voltage from the record when the record is played back to control the operation of the movable members, and a synchro for each of said movable members connected to be operated in coordination with the movement of one of said members and to receive the supplementary signal voltage from said record when the record is played back and compare it with the instant position of their associated movable members to produce a corrective signal voltage if the instant position of the movable member as established by the primary signal voltage is inaccurate, said synchro being also connected to transmit said corrective signal voltage to said control circuit to modify the control established by the primary signal voltage to produce the correct positioning of the movable member, whereby a specific operation may be accurately repeated by reproducing the signal voltage from the record.

9. In a control system for controlling the operation of movable members of a machine tool, power means connected to actuate said movable members in their respective paths of travel at variable rates of movement, a record containing recorded data constituting a velocity signal voltage representing the velocity of said movable members at each instant in an operation and a position signal voltage representing the position of said movable members at each instant in the operation, a control circuit connected to effect control of said power means for controlling the movement of said movable members and to be actuated by said velocity signal voltage reproduced from the record to control the velocity of said movable members, and a sensing device for each of said movable members connected to receive the position signal voltage reproduced from the record and compare it with the instant position of their associated movable members to produce a corrective signal voltage if the instant position of the movable member as established by the velocity signal voltage is inaccurate, said sensing device being also connected to transmit said corrective signal voltage to said control circuit to modify the control established by the velocity signal voltage to effect the correct positioning of the movable member, whereby a specific operation may be accurately repeated by reproducing the signal voltages from the record.

10. In a control system for controlling the operation of a machine tool having members movable at variable rates, a cutter disposed to operate upon a workpiece, a sensing device connected to cooperate with a pattern to produce a signal voltage in accordance with the contour of the pattern for controlling the velocity of the movable members to cause the cutter to reproduce the pattern in the workpiece, a synchro for each movable member of the machine which is under the control of the pattern, each of said synchros being connected to be operated in coordination with its associated movable member to produce a signal voltage in accordance with the instant position of the movable member as it is being moved under the control of the pattern, a source connected to supply a carrier voltage of a different frequency than the signal voltage from said synchros, a modulator circuit for each of said synchros connected to receive the carrier voltage and the position signal voltage from its associated synchro to modulate the carrier voltage in accordance with the position signal voltage, and a recording apparatus connected to record the modulated carrier voltage and the velocity signal voltage produced by said sensing device, whereby the recorded data may be subsequently reproduced and utilized for controlling the machine to repeat the operation without employing the pattern.

11. In a control system for controlling the operation of movable members of a machine tool having a cutter disposed to operate upon a workpiece, a scanning device connected to scan the contour of a pattern and produce a square wave voltage in accordance with the contour of the pattern for controlling the velocity of the movable members at each instant in the operation to effect movement of the cutter relative to the workpiece in a path corresponding to the contour of the pattern, a synchro for each of the movable members operating under the control of the pattern, each of said synchros being connected to be operated in coordination with its associated movable member to produce a signal voltage in accordance with the instant position of the movable member as it is being moved under the control of the pattern, a carrier voltage source, a modulator circuit for each of said synchros connected to modulate the carrier voltage in accordance with the position signal voltage produced by its associated synchro, a recording apparatus connected to record said square wave voltage and said modulated carrier voltage for subsequent reproduction, a discriminator circuit for each synchro connected to receive the reproduced modulated carrier voltage from the record and demodulate it to reproduce the position signal voltage originally produced by its associated synchro, said discriminator circuit being connected to transmit the reproduced position signal voltage to its associated synchro from whence it originated to compare it with the instant position of its associated movable member for the purpose of producing a corrective signal voltage whenever the position of said member does not correspond with its position at the same instant in the operation when the record was made, and a control circuit connected to be actuated by the square wave voltage reproduced from the record to regulate the velocity of the movable members in accordance with the square wave voltage, and to receive the corrective signal voltages from the synchros to modify the control produced by the square wave voltage if it produces inaccurate position of the movable members at any instant in the operation, whereby a specific operation may be accurately repeated from the data stored on the record.

12. In a motion control system for servo positioning a machine member, a power source, a servo motor energized by said power source and coupled to move the machine member, a motor controller operable to control said power to said servo motor subject to the demands of a servo control signal, a machine member position measurement apparatus operable to produce a measurement position signal indicative of the instant position of the machine member, a stored intelligence source, an apparatus connected to extract a primary velocity signal and a secondary position signal from said intelligence source, means connected to produce an error signal in response to the difference between said secondary position signal and said measurement position signal, and means operably connected to employ said error signal to modify the primary velocity signal and thereby produce the servo control signal for controlling the operation of said servo motor to effect precise instant positioning of the machine member.

13. In a motion control system for controlling the movement of a machine member, power means connected to move the machine member in its path of travel at variable rates of movement, a stored intelligence source, an apparatus connected to extract a primary velocity signal and a secondary position signal from said intelligence source, a control circuit connected to control said power means for controlling the movement of the machine member and to be actuated by the primary velocity signal from said intelligence source to control the velocity of the movement of the machine member, and a sensing device connected to receive the secondary position signal from said intelligence source and compare it with the instant position of the machine member to produce an error signal if the instant position of the machine member as established by the primary velocity signal is inaccurate, said sensing device being also connected to transmit said error signal to said control circuit to modify the control established by the primary velocity signal to effect the correct positioning of the movable member, whereby a specific operation may be accurately repeated by employing the information stored in said intelligence source for controlling the movement of the machine member.

14. In a motion control system for controlling the movement of a machine member, power means connected to move the machine member in its path of travel at variable rates of movement, a record containing recorded data constituting information indicative of the required movements of the machine member to perform a specific operation, an apparatus connected to produce a primary velocity signal and a secondary position signal from the information on said record, a control circuit connected to control said power means for controlling the movement of the machine member and to be actuated by the primary velocity signal produced by said apparatus to control the velocity of the movement of the machine member at each instant in the operation, and a synchro connected to receive the secondary position signal produced by said apparatus and compare it with the instant position of the machine member to produce an error signal whenever the instant position of the machine member as established by the primary velocity signal is inaccurate, said synchro being also connected to transmit said error signal to said control circuit to modify the control established by the primary velocity signal to effect the correct positioning of the movable member at each instant in the operation, whereby a specific operation may be accurately repeated by employing the information stored on said record for controlling the movement of the machine member.

15. In a motion control system for controlling the movement of a machine member, power means connected to move the machine member in its path of travel at variable rates of movement, a record containing recorded data representing information indicative of the velocity of the machine member at each instant in a specific operation and the position of the machine member at each instant in the same operation, a control circuit connected to control said power means for controlling the movement of the machine member and to be actuated to control the velocity of the machine member by the information from said record that indicates the velocity of the machine member at each instant in the operation, and a synchro connected to receive the information from the record that indicates the position of the machine member and compare it with the instant position of the machine member to produce an error signal if the instant position of the machine member as established by the velocity information is inaccurate, said synchro being also connected to transmit said error signal to said control circuit to modify the control established by the velocity information to effect the correct positioning of the movable member at each instant in the operation, whereby a specific operation may be accurately repeated by employing the information stored on said record for controlling the movement of the machine member.

16. A method of controlling the power operation of a machine member comprising, producing a velocity signal voltage as a function of the velocity of the machine member at each instant in the operation, producing a position signal voltage as a function of the position of said member at each instant in the operation, recording said velocity signal voltage and said position signal voltage to establish a record of the velocity and position of said machine member at each instant in the operation, reproducing said signal voltages from the record, applying said velocity signal voltage to a motor control circuit for controlling the velocity of the machine member, comparing the reproduced position signal voltage with the position of the machine member at each corresponding instant in the operation, producing a position error signal whenever the comparison of the reproduced position signal voltage with the position of the machine member indicates an error in the position of the machine member at any instant in the operation, and applying said position error signal voltage to function in the motor control circuit to modify the velocity of the machine member as established by said velocity signal voltage to achieve its proper positioning.

17. A method of controlling the power operation of a machine member comprising, recording data establishing the velocity of the machine member at each instant in the operation, recording data establishing the position of the machine member at each instant in the operation, reproducing said velocity and position data from the record, applying the data establishing the velocity of the machine member to a motor control circuit to control the velocity of the machine member, comparing the reproduced position data with the position of the machine member at each corresponding instant in the operation, producing a position error signal whenever the comparison of the reproduced position data with the position of the machine member indicates an error in the position of the machine member at any instant in the operation, and applying said position error signals to function in the motor control circuit to modify the velocity of the machine member as established by said velocity data to achieve its proper positioning.

References Cited in the file of this patent

UNITED STATES PATENTS

| | | |
|---|---|---|
| 2,475,245 | Leaver et al. | July 5, 1949 |
| 2,521,946 | Rathje | Sept. 12, 1950 |
| 2,537,770 | Livingston | Jan. 9, 1951 |
| 2,574,104 | Ireland | Nov. 6, 1951 |
| 2,628,539 | Neergaard | Feb. 17, 1953 |
| 2,629,844 | Eserkaln | Feb. 24, 1953 |
| 2,698,410 | Madsden et al. | Dec. 28, 1954 |